United States Patent
Koshika et al.

(10) Patent No.: US 12,555,786 B2
(45) Date of Patent: Feb. 17, 2026

(54) POSITIVE ELECTRODE ACTIVE MATERIAL FOR LITHIUM ION SECONDARY BATTERY, METHOD FOR PRODUCING THE SAME, AND LITHIUM ION SECONDARY BATTERY

(71) Applicant: SUMITOMO METAL MINING CO., LTD., Tokyo (JP)

(72) Inventors: Yuki Koshika, Niihama (JP); Haruki Kaneda, Niihama (JP)

(73) Assignee: SUMITOMO METAL MINING CO., LTD., Tokyo (JP)

(*) Notice: Subject to any disclaimer, the term of this patent is extended or adjusted under 35 U.S.C. 154(b) by 405 days.

(21) Appl. No.: 18/028,347

(22) PCT Filed: Sep. 24, 2021

(86) PCT No.: PCT/JP2021/035147
§ 371 (c)(1),
(2) Date: Mar. 24, 2023

(87) PCT Pub. No.: WO2022/065443
PCT Pub. Date: Mar. 31, 2022

(65) Prior Publication Data
US 2023/0378455 A1 Nov. 23, 2023

(30) Foreign Application Priority Data
Sep. 25, 2020 (JP) .................. 2020-161397

(51) Int. Cl.
*H01M 4/525* (2010.01)
*C01G 53/50* (2025.01)
(Continued)

(52) U.S. Cl.
CPC ............ *H01M 4/525* (2013.01); *C01G 53/50* (2013.01); *H01M 4/131* (2013.01); *H01M 4/505* (2013.01);
(Continued)

(58) Field of Classification Search
None
See application file for complete search history.

(56) References Cited

U.S. PATENT DOCUMENTS

2013/0277604 A1   10/2013   Shimokita et al.
2014/0011090 A1   1/2014    Toya et al.
(Continued)

FOREIGN PATENT DOCUMENTS

JP   H04-319260 A    11/1992
JP   2002-151071 A   5/2002
(Continued)

OTHER PUBLICATIONS

International Search Report dated Nov. 30, 2021, issued in counterpart International Application No. PCT/JP2021/035147 (4 pages; in English).
(Continued)

*Primary Examiner* — Carlos Barcena
(74) *Attorney, Agent, or Firm* — WHDA, LLP

(57) ABSTRACT

A positive electrode active material for a lithium ion secondary battery, in which the lithium-nickel-manganese composite oxide has a hexagonal layered structure, a mole number ratio of elements is represented as Li:Ni:Mn:M:Ti=a:(1-x-y-z):x:y:z, provided that $0.97 \leq a \leq 1.25$, $0.035 \leq x \leq 0.15$, $0 \leq y \leq 0.15$, and $0.01 \leq z \leq 0.05$, a ratio of a total amount of peak intensities of most intense peaks of a titanium compound to a (003) diffraction peak intensity that is the most intense peak of the hexagonal layered structure is 0.2 or less, a crystallite diameter at (003) plane is 80 nm or more and less than 160 nm, and a specific surface area is 0.7 m²/g or more and 4.0 m²/g or less.

8 Claims, 6 Drawing Sheets

(51) Int. Cl.
  *H01M 4/131* (2010.01)
  *H01M 4/505* (2010.01)
  *H01M 10/0525* (2010.01)
  *H01M 4/02* (2006.01)

(52) U.S. Cl.
  CPC ..... *H01M 10/0525* (2013.01); *C01P 2002/54* (2013.01); *C01P 2002/60* (2013.01); *C01P 2002/74* (2013.01); *C01P 2004/50* (2013.01); *C01P 2004/61* (2013.01); *C01P 2006/12* (2013.01); *C01P 2006/40* (2013.01); *H01M 2004/021* (2013.01); *H01M 2004/028* (2013.01)

(56) References Cited

U.S. PATENT DOCUMENTS

| | | | |
|---|---|---|---|
| 2015/0188136 A1* | 7/2015 | Mori | C01G 53/42 429/223 |
| 2015/0194673 A1 | 7/2015 | Takagi et al. | |
| 2017/0317339 A1 | 11/2017 | Shimokita et al. | |
| 2018/0347069 A1 | 12/2018 | Toya et al. | |

FOREIGN PATENT DOCUMENTS

| | | |
|---|---|---|
| JP | 2005-251716 A | 9/2005 |
| JP | 2011-108554 A | 6/2011 |
| JP | 2013-239434 A | 11/2013 |
| JP | 2020-102431 A | 7/2020 |
| JP | 2020-102432 A | 7/2020 |
| KR | 20150030232 A | 3/2015 |
| WO | 2012/131881 A | 10/2012 |
| WO | 2014/034430 A | 3/2014 |
| WO | 2020/195431 A | 10/2020 |

OTHER PUBLICATIONS

International Preliminary Report on Patentability and Notification of Transmittal of Copies Thereof dated Mar. 28, 2023, issued in counterpart International Application No. PCT/JP2021/035147 (12 pages; in English).

Office Action dated Jan. 12, 2026, issued in counterpart KR Application No. 10-2023-7008982, with English translation. (20 pages).

Zhang, D. et al. Effect of Ti ion doping electrochemical performance of Ni-rich LiNi0.8Co0.1O2 cathode material, Electrochimica Acta, vol. 328, 2019. (11 pages); cited in KR Office Action dated Jan. 12, 2026.

* cited by examiner

POSITIVE ELECTRODE ACTIVE MATERIAL FOR LITHIUM ION SECONDARY BATTERY, METHOD FOR PRODUCING THE SAME, AND LITHIUM ION SECONDARY BATTERY

TECHNICAL FIELD

The present invention relates to a positive electrode active material for a lithium ion secondary battery, a method for producing the same, and a lithium ion secondary battery.

BACKGROUND ART

In recent years, with widespread use of a portable electronic device such as a mobile phone terminal or a notebook personal computer, development of a small and lightweight non-aqueous electrolyte secondary battery having high energy density and durability has been strongly desired. Furthermore, development of high-output secondary batteries as batteries for electric tools and electric cars including hybrid cars has been strongly desired.

As a secondary battery satisfying such requirement, there is a non-aqueous electrolyte secondary battery such as a lithium ion secondary battery. Lithium ion secondary batteries using a layered or spinel type lithium-metal composite oxide as a positive electrode material can provide a high voltage of 4 V-class and thus are put to practical use as a battery having a high energy density.

As the lithium-metal composite oxide, lithium-cobalt composite oxide ($LiCoO_2$) that is relatively easily synthesized, lithium-nickel composite oxide ($LiNiO_2$) using nickel that is cheaper than cobalt, lithium-nickel-cobalt-manganese composite oxide ($LiNi_{1/3}Co_{1/3}Mn_{1/3}O_2$), lithium-manganese composite oxide ($LiMn_2O_4$) using manganese, lithium-nickel-manganese composite oxide ($LiNi_{0.5}Mn_{0.5}O_2$), and the like have been proposed.

However, when a non-aqueous electrolyte is used as a battery material of a lithium ion secondary battery, high thermal stability is required. For example, when short circuit occurs inside a lithium ion secondary battery, heat is generated by a rapid current, and therefore higher thermal stability is required.

In this regard, lithium-nickel-cobalt-manganese composite oxide ($LiNi_{1/3}Co_{1/3}Mn_{1/3}O_2$) that is excellent in thermal stability or lithium-nickel-manganese composite oxide has recently attracted attention. The lithium-nickel-cobalt-manganese composite oxide is a layered compound as lithium-cobalt composite oxide, lithium-nickel composite oxide, and the like and refers to a ternary system positive electrode active material in which a composition ratio of nickel, cobalt, and manganese at the transition metal site is 1:1:1.

Furthermore, in recent years, aiming at capacity enlargement, a ternary system positive electrode active material or a positive electrode active material (Hi-Ni positive electrode material) obtained by increasing a nickel ratio of a lithium-nickel-manganese composite oxide to have a high nickel ratio has attracted attention. However, since an increase in battery capacity attributable to the nickel ratio causes a trade-off with a decrease in thermal stability, a positive electrode active material with high performances as a lithium ion secondary battery (such as a high capacity, high cycle characteristics, and a high output), short circuit resistance, and thermal stability achieved at the same time is required.

There have been proposed some techniques of adding a heterogeneous element such as niobium to a lithium-metal composite oxide in order to improve battery characteristics such as thermal stability. For example, in Patent Literature 1, there has been proposed a positive electrode active material for a non-aqueous secondary battery, formed of a composition containing at least one or more compounds composed of lithium, nickel, cobalt, an element M, niobium, and oxygen. According to this proposal, a positive electrode active material having high thermal stability and a large discharge capacity is supposed to be obtained since a Li—Nb—O-based compound existing in the vicinity of surfaces of particles or inside the particles has high thermal stability.

Furthermore, in Patent Literature 2, there has been proposed a positive electrode active material for a non-aqueous electrolyte secondary battery, formed of a lithium-transition metal composite oxide which is obtained by a production method including a niobium coating step and a firing step, the positive electrode active material having a porous structure and a specific surface area of 2.0 to 7.0 $m^2/g$. By using this positive electrode active material, a non-aqueous electrolyte secondary battery having high safety, high battery capacity, and excellent cycle characteristics is supposed to be obtainable.

Furthermore, in Patent Literature 3, there has been proposed a positive electrode active material for a non-aqueous electrolyte secondary battery, the positive electrode active material having at least a lithium-transition metal composite oxide with a layered structure, in which the lithium-transition metal composite oxide is present in a form of particles formed of one or both of primary particles and secondary particles as an aggregate of the primary particles, and a compound having at least one selected from the group consisting of molybdenum, vanadium, tungsten, boron, and fluorine is present on at least surfaces of the particles. By having the above-described compound on the surface of the particles, conductive property is supposed to be improved.

Furthermore, in Patent Literature 4, there has been proposed a lithium transition metal-based compound powder for a positive electrode material of a lithium secondary battery, the lithium transition metal-based compound powder containing a lithium transition metal-based compound capable of inserting and de-inserting lithium ions as a main component, and formed by adding one compound containing at least one element selected from the group consisting of B and Bi and one compound containing at least one element selected from the group consisting of Mo, W, Ti, Ta, and Re together to the main component as a raw material, and then firing the resulting mixture. Additive elements are added together, and then the resulting mixture is fired, and thereby a lithium-containing transition metal-based compound powder which improves a rate and output characteristics and facilitates handling and preparation of an electrode can be obtained.

Furthermore, in Patent Literature 5, there has been proposed a positive electrode composition for a non-aqueous electrolyte solution secondary battery, the positive electrode composition containing a lithium-transition metal composite oxide and a boron compound containing at least a boron element and an oxygen element. By using a positive electrode composition containing a lithium-transition metal composite oxide essentially containing nickel and tungsten and a specific boron compound, output characteristics and cycle characteristics can be improved in the positive electrode composition using the lithium-transition metal composite oxide.

Furthermore, in Patent Literature 6, there has been proposed a positive electrode active material for a non-aqueous electrolyte secondary battery, formed of a lithium-nickel-manganese composite oxide configured by a hexagonal lithium-containing composite oxide having a layered structure, in which the positive electrode active material has an average particle size of 2 to 8 μm, a value [(d90−d10)/average particle size], which is an index indicating the spread of particle size distribution, of 0.60 or less, and a hollow structure provided with an outer shell section of aggregated sintered primary particles formed therein and a hollow part existing thereinside. This positive electrode active material is supposed to provide a high capacity and good cycle characteristics and be capable of providing a high output when used in a non-aqueous secondary battery.

Furthermore, Patent Literature 7 describes that, by adding 1 to 10% of zirconium at a molar ratio with respect to cobalt to a lithium-cobalt composite oxide, the surfaces of lithium-cobalt composite oxide particles are covered with zirconium oxide or a composite oxide of lithium and zirconium, and when the lithium-cobalt composite oxide is used for a positive electrode of a secondary battery, decomposition reaction or crystal destruction of an electrolyte solution at a high potential is suppressed so that excellent cycle characteristics and storage characteristics are supposed to be exhibited.

CITATION LIST

Patent Literature

Patent Literature 1: JP 2002-151071 A
Patent Literature 2: WO 2014/034430 A
Patent Literature 3: JP 2005-251716 A
Patent Literature 4: JP 2011-108554 A
Patent Literature 5: JP 2013-239434 A
Patent Literature 6: WO 2012/131881 A
Patent Literature 7: JP H4-319260 A

SUMMARY OF INVENTION

Technical Problem

However, in any of the above proposals, although the battery capacity, the output characteristics, and durability are improved, an improvement in thermal stability is not sufficient, and thus a further improvement in thermal stability is required.

As a method of enhancing thermal stability at the time of overcharge, a method of coating a surface of a positive electrode active material with an oxide such as $SiO_2$, $Al_2O_3$, or $ZrO_2$ has been proposed. However, according to this method, an initial capacity decrease may be large or a coating layer may act as a resistance so as to decrease output characteristics. Furthermore, since processes are cumbersome and scale-up is difficult, industrial-scale production may be difficult in many cases.

Furthermore, as the above proposals, a method of adding a heterogeneous element into a positive electrode active material to enhance thermal stability at the time of overcharge has also been proposed. However, since cationic mixing in which a metal element such as nickel migrates into the site of lithium ion is likely to occur in a positive electrode active material having a high nickel ratio, it is necessary to decrease a firing temperature to be lower than that of a positive electrode active material having a low nickel ratio, and the heterogeneous element is less likely to be solid-solved in the active material.

The present invention has been made in view of such circumstances, and an object thereof is to provide a positive electrode active material with which a lithium ion secondary battery with both excellent battery capacity and high thermal stability achieved at a high level is obtainable. Furthermore, another object of the present invention is to provide a method capable of producing such a positive electrode active material easily in industrial scale production.

Solution to Problem

According to a first aspect of the present invention, there is provided a positive electrode active material for a lithium ion secondary battery, including a lithium-nickel-manganese composite oxide configured by secondary particles with a plurality of aggregated primary particles,
   wherein the lithium-nickel-manganese composite oxide has a hexagonal layered structure and contains lithium (Li), nickel (Ni), manganese (Mn), an element M (M) that is at least one element selected from the group consisting of Co, V, Mg, Mo, Ca, Cr, Ta, Na, W, Fe, Zn, B, Si, P, Zr, Nb, and Al, and titanium (Ti),
   a mole number ratio of respective elements is represented as Li:Ni:Mn:M:Ti=a:(1−x−y−z):x:y:z, provided that 0.97≤a≤1.25, 0.03≤x≤0.15, 0≤y≤0.15, and 0.01≤z≤0.05,
   a ratio of a total amount of peak intensities of most intense peaks of a titanium compound to a (003) diffraction peak intensity that is the most intense peak of a hexagonal layered structure in XRD measurement of the positive electrode active material in XRD measurement of the positive electrode active material is 0.2 or less,
   a crystallite diameter at (003) plane as determined by the XRD measurement is 80 nm or more and less than 160 nm, and
   a specific surface area as measured by a BET method is 0.7 $m^2$/g or more and 4.0 $m^2$/g or less.

Furthermore, it is preferable that [(D90−D10)/Mv] calculated by D90 and D10 based on the volume standard in a particle size distribution by a laser diffraction scattering method and a volume average particle diameter (Mv) and indicating a particle size distribution width is 0.80 or more and 1.20 or less. Furthermore, it is preferable that the volume average particle diameter Mv is 8 μm or more and 20 μm or less. Furthermore, the amount of lithium eluted when the positive electrode active material is immersed in water is preferably 0.2% by mass or less with respect to the whole positive electrode active material.

According to a second aspect of the present invention, there is provided a method for producing a positive electrode active material for a lithium ion secondary battery which contains a lithium-nickel-manganese composite oxide configured by secondary particles with a plurality of aggregated primary particles, the method including:
   a mixing step of adding a mixture containing at least a nickel-manganese composite compound, a titanium compound, and a lithium compound;
   a firing step of firing the mixture in an oxidizing atmosphere having an oxygen concentration of 80 vol % or more and 100 vol % or less at 700° C. or higher and 950° C. or lower so as to obtain the lithium-nickel-manganese composite oxide;
   a water-washing step of mixing water at a ratio of 50 parts by mass or more and 200 parts by mass or less with respect to 100 parts by mass of the lithium-nickel-manganese composite oxide and stirring the mixture so as to perform solid-liquid separation; and
   a drying step of drying the water-washed lithium-nickel-manganese composite oxide, wherein the nickel-manganese composite compound contains nickel (Ni), manganese (Mn), and an element M (M) that is at least one element selected from the group consisting of Co, V, Mg, Mo, Ca, Cr, Ta, Na, W, Fe, Zn, B, Si, P, Zr, Nb, and Al, and a mole number ratio of respective elements is represented as Ni:Mn:M=(1−x−y):x:y, provided that $0 \le x \le 0.15$ and $0 \le y \le 0.15$, a ratio (Li/Me) of a lithium mole number (Li) to a total mole number (Me) of nickel, manganese, the element M, and titanium contained in the mixture obtained in the mixing step is 0.97 or more and 1.25 or less, and a ratio (Ti/Me) of a titanium mole number (Ti) to the total mole number (Me) is 0.01 or more and 0.05 or less, a ratio of a total amount of peak intensities of most intense peaks of the titanium compound to a (003) diffraction peak intensity that is the most intense peak of a hexagonal layered structure in XRD measurement of the positive electrode active material is 0.2 or less, and a crystallite diameter at (003) plane as determined by the XRD measurement is 80 nm or more and less than 160 nm.

Furthermore, it is preferable that the volume average particle diameter Mv of the titanium compound is 0.01 μm or more and 5 μm or less. Furthermore, it is preferable that the titanium compound is a titanic acid compound or titanium oxide.

According to a third aspect of the present invention, there is provided a lithium ion secondary battery including: a positive electrode; a negative electrode; and a non-aqueous electrolyte, the positive electrode containing the positive electrode active material described above.

Advantageous Effects of Invention

According to the present invention, it is possible to provide a positive electrode active material with which a lithium ion secondary battery with both excellent battery capacity and high thermal stability achieved at a high level is obtainable. Furthermore, the present invention can produce such a positive electrode active material easily in industrial scale production, and is considered to be extremely industrially valuable.

BRIEF DESCRIPTION OF DRAWINGS

The upper part of FIG. 1 is a graph showing maximum oxygen generation peak intensities of positive electrode active materials obtained in Comparative Examples 1 to 4 and Example 1, and the lower part of FIG. 1 is a graph of initial discharge capacities of positive electrode active materials obtained in Comparative Examples 1 to 4 and Example 1, and a table showing the titanium content, peak intensity ratio, and presence/absence of water-washing.

DESCRIPTION OF EMBODIMENTS

Figure 1:
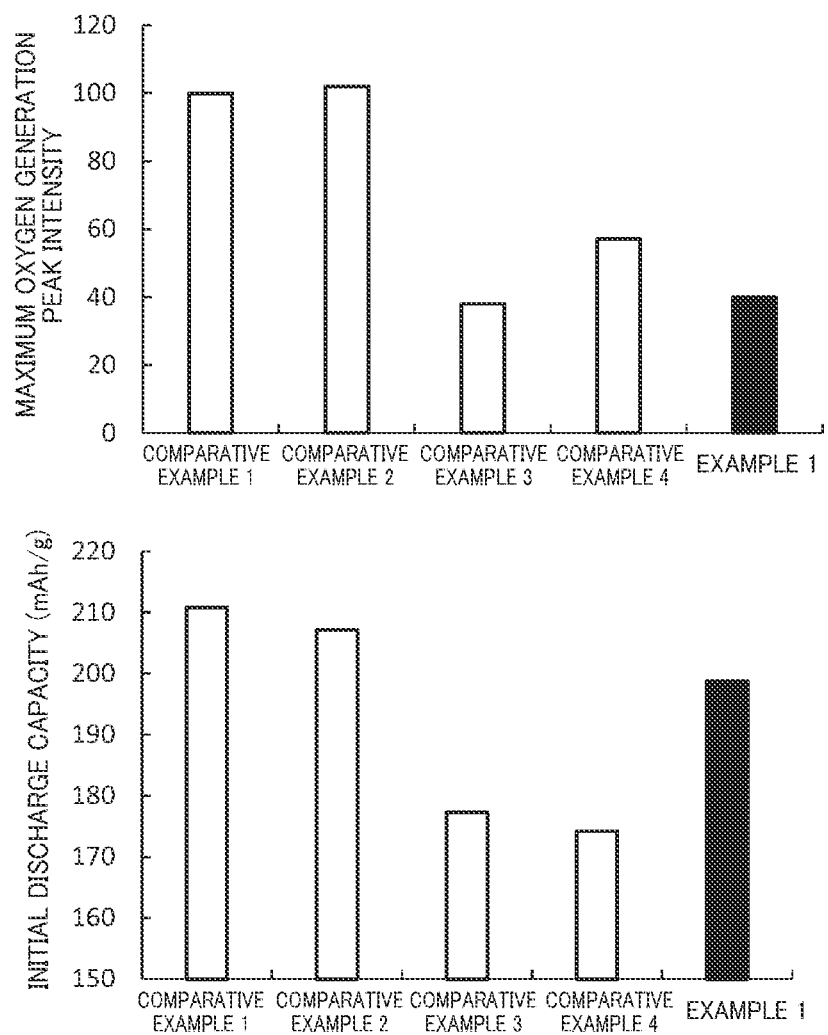

Hereinafter, regarding the present embodiment, a positive electrode active material for a lithium ion secondary battery, a method for producing the same, and a lithium ion secondary battery will be described. Note that, the present embodiment described below does not unreasonably limit the content of the present invention described in the claims, and can be modified without departing from the gist of the present invention. Furthermore, not all of the constitutions described in the present embodiment are required as means for solving the problems under the present invention.

1. Positive Electrode Active Material for Lithium Ion Secondary Battery

A positive electrode active material for a lithium ion secondary battery (hereinafter, also referred to as "positive electrode active material") according to the present embodiment contains a lithium-nickel-manganese composite oxide configured by secondary particles with a plurality of aggregated primary particles. That is, the lithium-nickel-manganese composite oxide is configured by polycrystal structure particles.

The lithium-nickel-manganese composite oxide has a hexagonal layered structure and contains a specific range of lithium (Li), nickel (Ni), manganese (Mn), an element M (M) that is at least one element selected from the group consisting of Co, V, Mg, Mo, Ca, Cr, Ta, Na, W, Fe, Zn, B, Si, P, Zr, Nb, and Al, and titanium (Ti).

When a combustible non-aqueous electrolyte is used as a constituent material of the lithium ion secondary battery, particularly high thermal stability is required. For example, it is known that, when the positive electrode and the negative electrode are short-circuited due to mixing of a metallic foreign matter or the like in a charging state, a short-circuit current is generated, the positive electrode active material is decomposed by heat generated by the short-circuit current so as to release oxygen from the crystal, and the oxygen reacts with the electrolyte to cause thermal runaway.

As a method of enhancing thermal stability at the time of charging the secondary battery, as described above, a method of coating a surface of a positive electrode active material with an oxide such as $SiO_2$, $Al_2O_3$, or $ZrO_2$ has been proposed. However, according to this method, an initial capacity decrease may be large or a coating layer may act as a resistance so as to decrease output characteristics. Furthermore, a method of adding a heterogeneous element into a positive electrode active material to enhance thermal stability at the time of overcharge has also been proposed; however, since cationic mixing in which a metal element such as nickel migrates into the site of lithium ion is likely to occur in a positive electrode active material having a high nickel ratio, it is necessary to decrease a firing temperature to be lower than that of a positive electrode active material having a low nickel ratio, and the heterogeneous element is less likely to be solid-solved in the positive electrode active material, and when a heterogeneous element is added, thermal stability at the time of overcharge is difficult to enhance while maintaining a high battery capacity.

The present inventor has conducted intensive studies, and as a result, has found the following findings: i) a specific amount of titanium is added to a lithium-nickel-manganese composite oxide having a high nickel ratio and containing a specific amount of manganese and firing is performed under controlling an atmosphere to a high oxygen concentration so that, while maintaining high battery characteristics (for example, a battery capacity), both thermal stability obtained by suppressing oxygen release at the time of overcharge and high battery characteristics can be achieved, and ii) the lithium-nickel-manganese composite oxide after firing is further washed with water so as to further improve the battery capacity, thereby completing the present invention.

Figure 2:
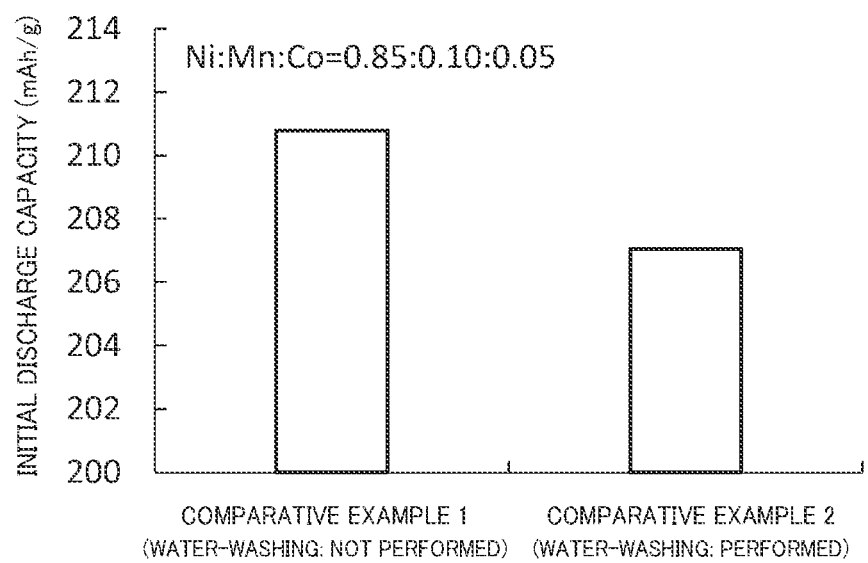
FIG. 2 is a graph showing initial discharge capacities of positive electrode active materials obtained in Comparative Example 1 and Comparative Example 2.
Figure 3:
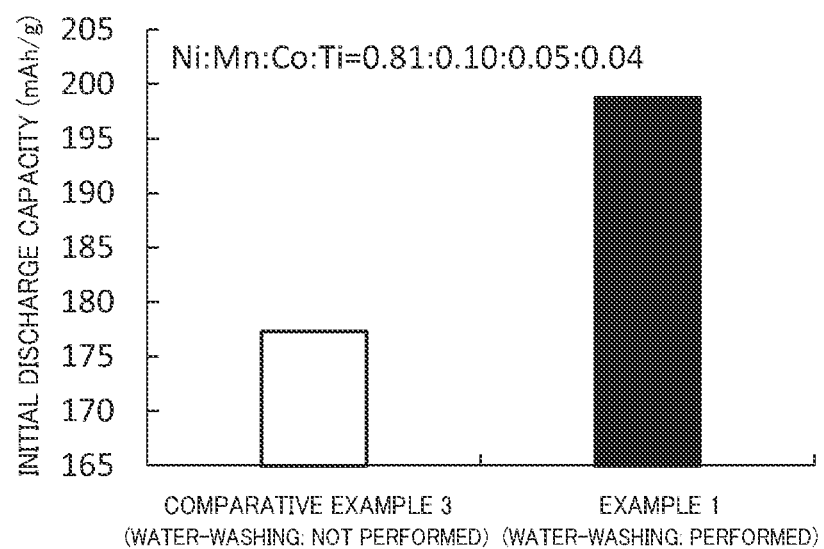
FIG. 3 is a graph showing initial discharge capacities of positive electrode active materials obtained in Comparative Example 3 and Example 1.

Hereinafter, an example of an effect obtained by containing titanium (Ti) in the lithium-nickel-manganese composite oxide according to the present embodiment will be described with reference to FIGS. 1 to 3. Note that, FIGS. 1 to 3 are made based on evaluation results of positive electrode active materials and secondary batteries obtained in Examples and Comparative Examples to be described below.

FIG. 1 is a graph showing evaluation results of maximum oxygen generation peak intensities and initial discharge capacities obtained using lithium-nickel-manganese composite oxides (positive electrode active materials) different in titanium content, distribution, and presence/absence of water-washing and drying after firing.

Note that, the maximum oxygen generation peak intensity is a relative intensity of the oxygen generation amount (Comparative Example 1 is regarded as 100) at the time of measuring the oxygen amount when the lithium-nickel-manganese composite oxide (positive electrode active material) is charged to an overcharged state and the temperature is increased from room temperature to 450° C., and a lower value of the maximum oxygen generation peak intensity indicates that the oxygen generation amount is small and thermal stability at the time of overcharge is high.

As shown in the upper graph of FIG. 1, in the positive electrode active materials of Comparative Example 3, Comparative Example 4, and Example 1 containing titanium, the maximum oxygen generation peak intensity is reduced and thermal stability is improved as compared with the positive electrode active materials of Comparative Examples 1 and 2 containing no titanium.

Furthermore, as shown in the lower graph of FIG. 1, in the positive electrode active material of Example 1 which contains titanium, has a peak intensity ratio of 0.2 or less, and has been washed with water and dried, the initial discharge capacity is significantly improved as compared with the positive electrode active material of Comparative Example 3 which contains titanium but has not been washed with water and dried, or the positive electrode active material of Comparative Example 4 which has a peak intensity ratio exceeding 0.2.

Note that, as described later, the peak intensity ratio refers to a ratio of a total amount of peak intensities of most intense peaks of diffraction peaks derived from respective titanium compounds (titanium oxide, lithium titanate, and the like) to a (003) diffraction peak intensity that is the most intense peak of a hexagonal layered structure. For example, as in Comparative Example 3 and Example 1 in FIG. 1, when the peak intensity ratio is 0.2 or less, it is indicated that titanium is substantially solid-solved in primary particles of the lithium-nickel-manganese composite oxide. Furthermore, for example, as in Comparative Example 4 in FIG. 1, when the peak intensity ratio exceeds 0.2, it is indicated that a titanium compound is formed on the surface of particles of the lithium-nickel-manganese composite oxide.

From the above result, it is clearly found that the positive electrode active material containing a lithium-nickel-manganese composite oxide according to the present embodiment i) has high thermal stability regardless of a high nickel ratio, and ii) has a further improved battery capacity by performing water-washing and drying after firing and can provide both a high battery capacity and high thermal stability achieved at a higher level.

FIG. 2 is a graph showing evaluation results of initial discharge capacities using positive electrode active materials of Comparative Example 1 and Comparative Example 2 obtained under the same production conditions except for no titanium contained, and presence/absence of water-washing and drying. FIG. 3 is a graph showing evaluation results of initial discharge capacities using positive electrode active materials of Comparative Example 3 and Example 1 obtained under the same production conditions except for titanium contained, and presence/absence of water-washing and drying.

As shown in FIG. 2, it is shown that, in a lithium-nickel-manganese composite oxide having a high nickel ratio and containing a specific amount of manganese, when no titanium is contained, the battery capacity (initial discharge capacity) is decreased by performing water-washing and drying after firing. Details of the reason for this are not clear, but it is considered that lithium on the particle surface or at the grain boundary of the lithium-nickel-manganese composite oxide is eluted by water-washing, and a reaction resistance increases, so that the battery capacity decreases.

On the other hand, as shown in FIG. 3, when titanium is contained, as compared to Comparative Example 3 in which water-washing and drying were not performed, the battery capacity (initial discharge capacity) is significantly improved in the positive electrode active material of Example 1 in which water-washing was performed. Although the details of the reason for this are unknown, it is presumed that titanium solid-solved inside the primary particles has an effect of suppressing deterioration of the particle surface and the grain boundary due to elution of lithium and suppressing an increase in the reaction resistance.

Note that, as described below, a specific amount of manganese is contained, the firing atmosphere in a firing step (S20) is controlled to a high oxygen concentration, and the production conditions are appropriately adjusted, whereby titanium can be solid-solved in the primary particles. Therefore, in the positive electrode active material according to the present embodiment, specific amounts of titanium and manganese are contained in the positive electrode active material having a high nickel ratio, titanium is almost solid-solved in the primary particles, and further, water-washing and drying are performed, so that a high battery capacity and high thermal stability can be achieved at the same time at a higher level. Hereinafter, a configuration of the positive electrode active material according to the present embodiment will be described in detail.

[Lithium-Nickel-Manganese Composite Oxide]

The lithium-nickel-manganese composite oxide contained in the positive electrode active material according to the present embodiment is configured by secondary particles with a plurality of aggregated primary particles.

The lithium-nickel-manganese composite oxide has a hexagonal layered structure and contains lithium (Li), nickel (Ni), manganese (Mn), an element M (M) that is at least one element selected from the group consisting of Co, V, Mg, Mo, Ca, Cr, Ta, Na, W, Fe, Zn, B, Si, P, Zr, Nb, and Al, and titanium (Ti). Furthermore, a mole number ratio of the respective elements is represented as Li:Ni:Mn:M:Ti=a:(1-x-y-z):x:y z, provided that $0.97 \leq a \leq 1.25$, $0.03 \leq x \leq 0.15$, $0 \leq y \leq 0.15$, and $0.01 \leq z \leq 0.05$.

Furthermore, regarding the positive electrode active material according to the present embodiment, in X-ray diffraction (XRD) measurement, a diffraction peak other than that of the hexagonal layered structure is not almost detected, and thus it can be said that almost the whole amount of titanium is solid-solved in the primary particles. Furthermore, a crystallite diameter at the (003) plane obtained by XRD measurement is 80 nm or more and less than 160 nm, and a specific surface area as measured by a BET method is 0.7 m$^2$/g or more and 4.0 m$^2$/g or less.

Such a positive electrode active material can be prepared, for example, by appropriately adjusting the conditions of each step in a production method described later. For example, in a mixing step (S10), it is effective to use a titanium compound having an average particle size within a specific range. Furthermore, the crystallite diameter at the (003) plane and the amount of lithium to be eluted in water can be adjusted by performing a water-washing step (S30) and a drying step (S40) to be described below. Hereinafter, each metal element contained in the lithium-nickel-manganese composite oxide will be described.

(Lithium)

In the above-described mole number ratio (molar ratio), the range of "a" indicating the mole number ratio of Li is 0.97≤a≤1.25 and preferably 1.00≤a≤1.15. When the range of "a" is in the above range, the reaction resistance of the positive electrode is decreased to improve the output of the battery. When the value of "a" is less than 0.97 or exceeds 1.25, the reaction resistance is increased to decrease the output of the battery in some cases.

(Manganese)

In the above-described mole number ratio (molar ratio), the range of "x" indicating the mole number ratio of Mn with respect to the mole number of the metal elements to be contained is 0.03≤x≤0.15 and preferably 0.03≤x≤0.10. When the value of "x" is in the above range, a high capacity and high thermal stability can be attained. On the other hand, when the value of "x" is less than 0.03, the thermal stability improving effect is not obtainable. Furthermore, when the value of "x" exceeds 0.15, the battery capacity is decreased. Furthermore, in the firing step (S20) to be described below, by containing manganese, the firing temperature can be relatively increased, and the dispersion of titanium or the like can be promoted. In a production method to be described later, even when the firing temperature is lowered, titanium can be dispersed throughout the positive electrode active material to be solid-solved therein by appropriately adjusting other production conditions.

(Element M)

In the above-described mole number ratio, the element M is at least one element selected from the group consisting of Co, V, Mg, Mo, Ca, Cr, Ta, Na, W, Fe, Zn, B, Si, P, Zr, Nb, and Al. The range of "y" indicating the mole number ratio of the element M is 0≤y≤0.15. When "y" is 0 or more, thermal stability, storage characteristics, battery characteristics, and the like can be improved. When "y" exceeds 0.15, the structure becomes unstable, and thus a compound having a layered crystal structure may not be formed, or the battery capacity may be decreased by a relative decrease in the ratio of Ni or Mn. For example, when M includes Co, superior battery capacity and output characteristics are attained. When M is Co, 0≤y≤0.10 is preferable. Furthermore, in the above-described mole number ratio, when the mole number ratio of Co included in the element M is designated as "y1", the mole number ratio is preferably 0≤y1≤0.10, and more preferably 0.01≤y1≤0.10.

(Titanium)

In the above-described mole number ratio, the range of "z" indicating the mole number of Ti is 0.01≤z≤0.05, and preferably 0.01≤z≤0.03. When the range of "z" is in the above range, oxygen release when titanium is used for a positive electrode of a secondary battery is suppressed, and high thermal stability can be obtained. On the other hand, when the value of "z" is less than 0.01, the solid-solving amount of titanium is not sufficient, and thus the thermal stability improving effect is insufficient. Furthermore, when the value of "z" exceeds 0.05, the percentage of Ni or Mn is relatively decreased, the crystal structure is not stable, and cationic mixing is likely to occur, so that the battery capacity is greatly decreased.

(Nickel)

In the mole number ratio, the lower limit of (1-x-y-z) indicating the mole number ratio of Ni is 0.65 or more, preferably 0.70 or more, and more preferably 0.80 or more. When the mole number ratio of nickel is in the above range, a secondary battery having a high battery capacity can be obtained. When the mole number ratio of nickel is high, the battery capacity is improved, but thermal stability may be decreased. However, the positive electrode active material according to the present embodiment can have very high thermal stability regardless of a high nickel ratio by a specific amount of Ti having a specific distribution and the water-washing step (S30) and the drying step (S40) being provided.

Note that, the composition of the lithium-nickel-manganese composite oxide can be measured by quantitative analysis using inductive coupled plasma (ICP) emission spectrometry.

(Distribution of Titanium)

Regarding the positive electrode active material according to the present embodiment, in XRD measurement, a diffraction peak derived from a compound containing titanium is not detected or is extremely weak, and a strong diffraction peak of the hexagonal layered structure is detected. That is, it is preferable that almost the whole amount of titanium is solid-solved in the primary particles in the lithium-nickel-manganese composite oxide.

For example, when the lithium-nickel-manganese composite oxide containing titanium is produced without using preferred production conditions as described below, titanium may not be solid-solved in the primary particles and titanium may be precipitated on the surfaces of the primary particles or grain boundaries between the primary particles. Examples of the form of titanium when precipitated on the surfaces of the primary particles or the like, include lithium titanate such as $TiO_2$ derived from a titanium compound used as a raw material and remaining as an unreacted product in the firing step and $LiTiO_2$ produced by reaction between a titanium compound and a lithium compound.

Herein, solid-solving of titanium in particles of the lithium-nickel-manganese composite oxide indicates, for example, a state where a peak derived from the titanium compound including $TiO_2$, $LiTiO_2$, or the like described above is not detected in XRD measurement or a peak is weak although being detected, and there is no influence on battery characteristics of a positive electrode active material to be substantially obtained.

Specifically, in XRD measurement using $CuK_\alpha$ ray, a ratio ($I_{Ti\ compound}/I_{(003)}$: hereinafter, referred to as "peak intensity ratio") of a total amount of peak intensities of most intense peaks of the titanium compound ($I_{Ti\ compound}$) to a (003) diffraction peak intensity ($I_{(003)}$) that is the most intense peak of a hexagonal layered structure is preferably 0.2 or less, and more preferably 0 or more and 0.1 or less, and may be 0. When the peak intensity ratio exceeds 0.2, a certain amount or more of the titanium compound is precipitated, and a battery capacity may be decreased. Note that, when each diffraction peak is equal to or lower than the detection limit, the diffraction peak intensity is set to 0 (zero).

For example, when $TiO_2$ and $LiTiO_2$ are detected as a titanium compound, the peak intensity ratio is a ratio $[(I_{TiO2}+I_{LiTiO2})/I_{(003)}]$ of a total amount of a diffraction peak intensity ($I_{TiO2}$) of most intense peaks of $TiO_2$ and a diffraction peak intensity ($I_{LiTiO2}$) of most intense peaks of $LiTiO_2$ to a (003) diffraction peak intensity ($I_{(003)}$) that is the most intense peak of the hexagonal layered structure.

Note that, the forms of $TiO_2$ include a rutile type and an anatase type. Thus, the intensity of the diffraction peak of $TiO_2$ refers to the sum of a (110) diffraction peak intensity ($I_{Tio2Rutile(110)}$) that is the most intense peak of rutile type $TiO_2$ and an integrated intensity ($I_{TiO2Anatase(101)}$) of a (101) diffraction peak that is the most intense peak of anatase type $TiO_2$. Herein, the position of the (110) diffraction peak that is the most intense peak of rutile type $TiO_2$ is 2θ=27.9° (from JCPDS number: 01-088-1175), and the position of the (101) diffraction peak that is the most intense peak of anatase type $TiO_2$ is 2 θ8=25.3° (from JCPDS number: 01-084-1286).

Furthermore, when a plurality of lithium titanates each having a different composition are detected at the same time, the peak intensity of the most intense peak of lithium titanate is calculated as the sum of the peak intensities of the most intense peak of respective lithium titanates. Examples of the lithium titanate include $LiTiO_2$, $Li_2TiO_3$, $Li_4TiO_4$, and $Li_4Ti_5O_{12}$.

Furthermore, when the diffraction peaks of other titanium compounds (for example, TiO, $Ti_2O_3$, TiC, and the like) are detected in XRD measurement, the peak intensity ratio is the sum of the diffraction peak intensities of the most intense peaks of all titanium compounds detected, with respect to $I_{(003)}$. For example, when $TiO_2$, $LiTiO_2$, and a titanium compound A other than $TiO_2$ and $LiTiO_2$ are detected as a titanium compound, assuming that the peak intensity of the most intense peak of the titanium compound A is designated as $I_{titanium\ compound\ A}$, the peak intensity ratio is $[(I_{TiO2}+I_{LiTiO2}+I_{titanium\ compound\ A})/I_{(003)}]$

[Crystallite Diameter at (003) Plane]

In the positive electrode active material according to the present embodiment, the crystallite diameter measured from a diffraction peak of the (003) plane derived from a hexagonal layered structure by XRD measurement (hereinafter, referred to as "crystallite diameter at the (003) plane") is preferably 80 nm or more and less than 160 nm, and may be 100 nm or more and less than 160 nm, 100 nm or more and 150 nm or less, or 100 nm or more and 140 nm or less. When the crystallite diameter at the (003) plane is in the above range, cracking of the positive electrode active material particles can be suppressed when charge and discharge are repeatedly performed while a high charge and discharge capacity is attained, so that durability can be improved.

On the other hand, when the crystallite diameter at the (003) plane is 160 nm or more, crystallinity is high and the discharge capacity is improved, but expansion and shrinkage per primary particle when charging and discharging increases, so that particle cracking may be likely to occur when repeatedly charging and discharging. Furthermore, when the crystallite diameter at the (003) plane is less than 80 nm, the discharge capacity decreases due to low crystallinity. Note that, the crystallite diameter at the (003) plane can be adjusted to the above range by appropriately adjusting the production conditions by a production method to be described later. Although described in detail later, for example, crystallinity is improved and a higher discharge capacity is obtained by water-washing and drying particles of the lithium-nickel-manganese composite oxide obtained by firing. Therefore, by setting the crystallite diameter at the (003) plane within the above range, it is possible to achieve both battery capacity and thermal stability at a high level and to have higher durability. Note that, the crystallite diameter at the (003) plane is calculated from Scherrer's equation using the full width at half maximum in the diffraction peak at the (003) plane derived from the hexagonal layered structure obtained by XRD measurement.

[Specific Surface Area]

It is preferable that, in the positive electrode active material according to the present embodiment, a specific surface area as measured by a BET method is 0.7 $m^2/g$ or more and 4.0 $m^2/g$ or less. When the specific surface area is 0.7 $m^2/g$ or more, the number of reaction sites into and out of which lithium ions can enter and exit increases, and the overvoltage at the end of discharge is reduced, so that the discharge capacity increases. The upper limit of the specific surface area may be 0.8 $m^2/g$ or more, or 0.9 $m^2/g$ or more. Even when the positive electrode active material according to the present embodiment has a relatively large specific surface area, high thermal stability and high battery capacity can be realized by combining a specific titanium distribution and a specific crystallite diameter.

Although described in detail in a water-washing step to be described later, when particles of the lithium-nickel-manganese composite oxide obtained by firing are washed with water and dried, excessive lithium components present on the surfaces of the particles and at the grain boundaries are eluted, and voids and irregularities are formed, so that the specific surface area is increased. In addition to this, for example, in a crushing step of a fired product (aggregate) after the firing step, sintering and aggregation are sufficiently disentangled to adjust the specific surface area to the above range, thereby making it possible to obtain a higher discharge capacity while improving durability.

On the other hand, when the specific surface area exceeds 4.0 $m^2/g$ in the positive electrode active material having a high nickel ratio, also in the case of removing the eluted alkaline components on the surface once in the water-washing step (S30), the alkaline components derived from lithium eluted from the particle surface by reaction with moisture in air is increased, and when the positive electrode active material is formed into a paste, the paste is gelled, so that an electrode plate is difficult to produce.

[Particle size distribution width: [(D90–D10)/Mv]]

In the positive electrode active material according to the present embodiment, [(D90–D10)/Mv] indicating a particle size distribution width calculated by D90 and D10 (particle sizes at 90% and 10% in volume integration of particle amounts in a particle size distribution curve) and a volume average particle diameter (Mv) in a particle size distribution obtained by a laser diffraction scattering method is preferably 0.80 or more and 1.20 or less.

When the particle size distribution of the positive electrode active material is in a wide range, there are many fine particles each having a particle size smaller than the average particle size and many coarse particles each having a particle size larger than the average particle size. When these fine particles and coarse particles are mixed, a packing density is increased, and an energy density per volume can be increased. Therefore, when the particle size distribution width is less than 0.80, the volume energy density is decreased. When a production method to be described below is used, the upper limit is 1.20. When the firing temperature to be described below exceeds 950° C., the particle size distribution width may exceed 1.20, but when a positive electrode active material is formed, the specific surface area may be decreased to increase the resistance of a positive electrode, and thus the battery capacity may be decreased.

[Volume Average Particle Diameter (Mv)]

The volume average particle diameter (Mv) of the positive electrode active material according to an embodiment of the present invention is preferably 8 µm or more and 20 µm or less, and more preferably 10 µm or more and 20 µm or less. In a case where the volume average particle diameter (Mv) is in the above range, when the positive electrode active material is used for a positive electrode of a secondary battery, it is possible to achieve both high output characteristics and battery capacity and high filling property to the positive electrode. When the average particle size of the secondary particles is less than 8 µm, a high filling property to a positive electrode may not be obtainable, and when the average particle size exceeds 20 µm, high output characteristics and battery capacity may not be obtained. Note that, the average particle size can be determined from, for example, a volume integrated value measured by a laser diffraction/scattering type particle size distribution analyzer.

[Eluted Lithium Amount]

In the positive electrode active material according to the present embodiment, the eluted lithium amount that is the amount of lithium to be eluted in water when the positive electrode active material is immersed in water is preferably 0.20% by mass or less with respect to the entire positive electrode active material, and may be 0.17% by mass or less or may be 0.15% by mass or less. Lithium is pulled out by stirring with water to decrease an eluted lithium amount, and when the eluted lithium amount is in the above range, the gelling at the time of preparing a paste is less likely to occur, and defects due to the gelling at the time of producing an electrode plate of a battery can be reduced. The lower limit of the eluted lithium amount is not particularly limited, but in a positive electrode active material obtained by a production method to be described later, the lower limit of the eluted lithium amount is, for example, 0.01% by mass or more, and may be 0.05% by mass or more or 0.08% by mass or more.

2. Method for Producing Positive Electrode Active Material for Lithium Ion Secondary Battery Next, a method for producing a positive electrode active material for a lithium ion secondary battery according to an embodiment of the present invention (hereinafter, also referred to as "positive electrode active material") will be described with reference to the drawings. Note that, the following description is an example of the production method and does not limit the production method.

Figure 4:
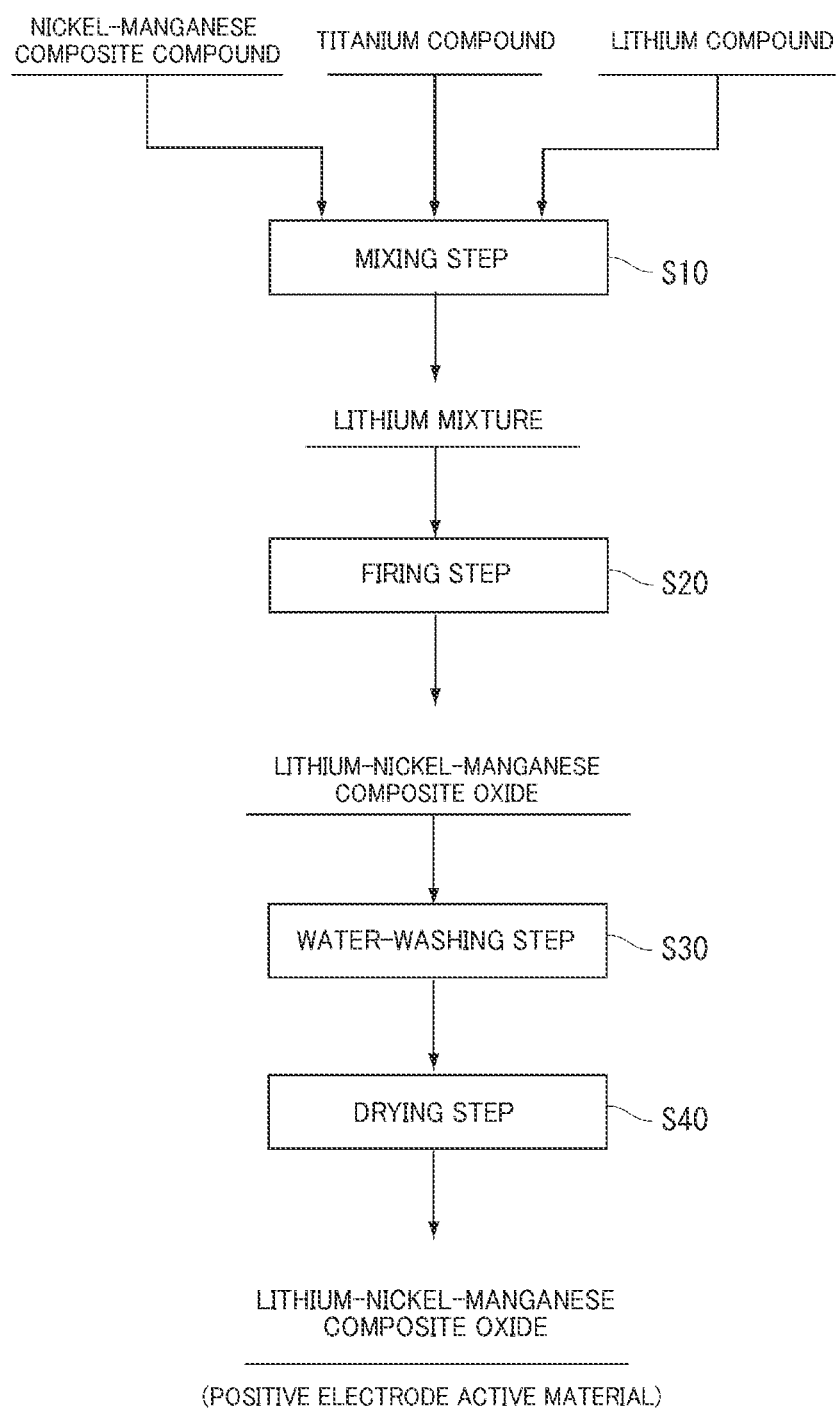
FIG. 4 is a diagram illustrating an example of a method for producing a positive electrode active material for a lithium ion secondary battery according to the present embodiment.
Figure 5:
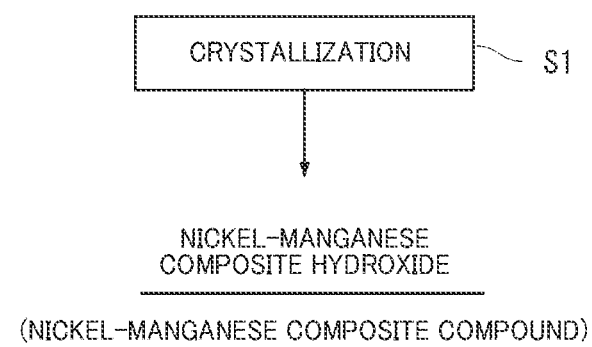
FIG. 5(A) and FIG. 5(B) are diagrams illustrating an example of a method for producing a nickel-manganese composite compound according to the present embodiment.
Figure 5:
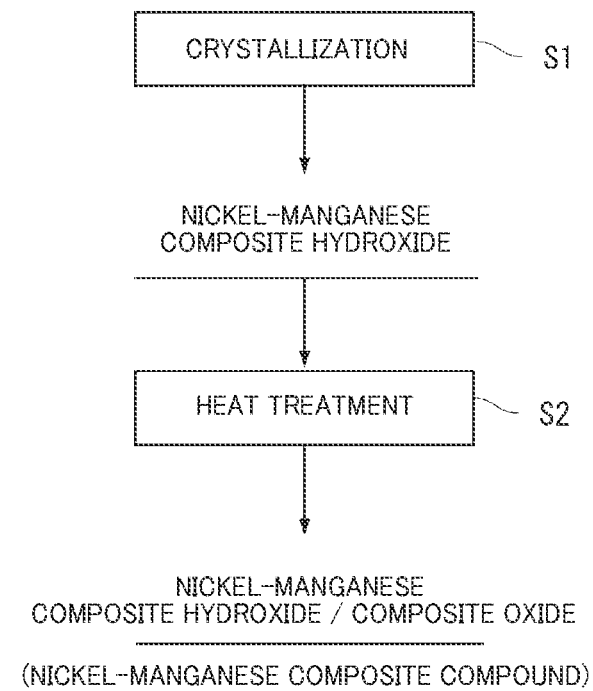

FIG. 4 and FIGS. 5(A) and 5(B) are process drawings illustrating the outline of an example of a method for producing a positive electrode active material according to the present embodiment. As illustrated in FIG. 4, the method for producing a positive electrode active material includes a mixing step (S10) of mixing at least a nickel-manganese composite compound, a titanium compound, and a lithium compound to obtain a mixture, a firing step (S20), a water-washing step (S30), and a drying step (S40). Furthermore, for example, as illustrated in FIGS. 5(A) and 5(B), the nickel-manganese composite compound to be used in the mixing step (S10) may be obtained by a method including a crystallization step (S1) and/or a heat treatment step (S2).

The positive electrode active material obtained by the production method according to the present embodiment has a high nickel ratio and contains specific amounts of manganese and titanium, titanium is solid-solved without the impurity phase precipitated to obtain a high capacity, and short circuit resistance and thermal stability can be enhanced by containing manganese and titanium. Furthermore, as will be described later, by providing the water-washing step (S30), the disarrangement of atomic arrangement of the lithium-nickel-manganese composite oxide is alleviated and the specific surface area is increased by elution of excessive lithium present on the particle surface or at the grain boundary, so that a higher battery capacity can be obtained. Hereinafter, each step will be described in detail.

[Crystallization Step (S1)]

As illustrated in FIG. 5(A), the crystallization step (S1) is a step of obtaining a nickel-manganese composite hydroxide (nickel-manganese composite compound) by crystallization.

It is preferable that the nickel-manganese composite hydroxide (hereinafter, also referred to as "composite hydroxide") obtained in the crystallization step (S1) contains nickel (Ni), manganese (Mn), and an element M (M) that is at least one element selected from the group consisting of Co, V, Mg, Mo, Ca, Cr, Ta, Na, W, Fe, Zn, B, Si, P, Zr, Nb, and Al, and a mole number ratio (molar ratio) of the respective elements is represented as Ni:Mn:M=1-x-y:x:y, provided that $0.03 \leq x \leq 0.15$ and $0 \leq y \leq 0.15$. Furthermore, since the contents (composition) of the respective elements (Ni, Mn, and M) in the nickel-manganese composite hydroxide are almost maintained also in the lithium-nickel-manganese composite oxide, the contents of the respective elements (Ni, Mn, and M) are preferably in the same range as the contents in the lithium-nickel-manganese composite oxide finally obtained.

The crystallization step (Si) can be performed by a known method as long as it can obtain a composite hydroxide having the above mole number ratio, and for example, the mixed aqueous solution containing at least nickel and manganese is neutralized by adding a neutralizer in a reaction tank while stirred at a certain speed so as to control the pH, and thus a nickel-manganese composite hydroxide is generated by co-precipitation.

As the mixed aqueous solution containing nickel and manganese, for example, a sulfate salt solution, nitrate salt solution or chloride solution of nickel and cobalt can be used. Furthermore, as described below, the mixed aqueous solution may contain the element M. The composition of the respective elements contained in the mixed aqueous solution almost matches the composition of the respective elements contained in a composite hydroxide to be obtained. Therefore, the composition of the respective elements in the mixed aqueous solution can be prepared so as to be the same as the target composition of the respective elements in the composite hydroxide. As the neutralizer, an alkaline aqueous solution can be used, and for example, sodium hydroxide, potassium hydroxide, or the like can be used.

Furthermore, a complexing agent may be added to the mixed aqueous solution along with the neutralizer. The complexing agent is not particularly limited as long as it can form a complex by binding with a nickel ion or another metal ion in the aqueous solution in the reaction tank (hereinafter, referred to as "reaction aqueous solution"), a known complexing agent can be used, and for example, an ammonium ion supplier can be used. The ammonium ion supplier is not particularly limited, but for example, ammonia, ammonium sulfate, ammonium chloride, ammonium carbonate, or ammonium fluoride can be used. The solubility of the metal ions in the reaction aqueous solution can be adjusted by adding a complexing agent.

In the crystallization step (S1), when a complexing agent is not used, regarding the temperature of the reaction aqueous solution, the temperature (liquid temperature) is preferably set to be in a range of higher than 60° C. and 80° C. or lower and the pH of the reaction aqueous solution at the above temperature is preferably 10 or more and 12 or less (at standard 25° C.). When the pH of the reaction aqueous solution exceeds 12, the composite hydroxide to be obtained becomes fine particles, the filterability deteriorates, and spherical particles may not be obtained. On the other hand, when the pH of the reaction aqueous solution is less than 10, the generation speed of composite hydroxide remarkably decreases, Ni remains in the filtrate, the precipitated Ni amount deviates from the intended composition, and the composite hydroxide having the intended ratio may not be obtained.

Furthermore, when the temperature of the reaction aqueous solution exceeds 60° C., the solubility of Ni increases, and the precipitated Ni amount deviates from the intended composition, and the phenomenon that coprecipitation does not occur can be avoided. On the other hand, when the temperature of the reaction aqueous solution exceeds 80° C., the slurry concentration (reaction aqueous solution concentration) increases due to the great evaporated moisture amount, and the solubility of Ni decreases, crystals such as sodium sulfate are generated in the filtrate, the concentration of impurities increases, and there is the possibility that the charge and discharge capacity of the positive electrode active material decreases.

In the crystallization step, when an ammonium ion supplier (complexing agent) is used, the temperature of the reaction aqueous solution is preferably 30° C. or higher and 60° C. or lower since the solubility of Ni in the reaction aqueous solution is increased, and the pH of the reaction aqueous solution is preferably 10 or more and 13 or less (at standard 25° C.) and more preferably 12 or more and 13 or less.

Furthermore, the ammonia concentration in the reaction aqueous solution is preferably maintained at a constant value within a range of 3 g/L or more and 25 g/L or less. When the ammonia concentration is less than 3 g/L, the solubility of metal ions cannot be maintained constant, and thus composite hydroxide primary particles having well-regulated shape and particle size may not be formed. Furthermore, since it is easy to form gel-like nuclei, the particle size distribution of a composite hydroxide to be obtained is also likely to spread. On the other hand, when the ammonia concentration exceeds 25 g/L, the solubility of metal ions becomes too high, the metal ion content remaining in the reaction aqueous solution increases, and deviation of the composition of a composite hydroxide to be obtained is likely to occur. Note that, when the ammonia concentration fluctuates, the solubility of metal ions fluctuates, uniform hydroxide particles are not formed, and it is thus preferable to maintain the ammonia concentration at a constant value. For example, the ammonia concentration is preferably maintained at a desired concentration by setting the width between the upper limit and the lower limit to about 5 g/L.

Furthermore, the nickel-manganese composite hydroxide may contain an element M that is at least one element selected from the group consisting of Co, V, Mg, Mo, Ca, Cr, Ta, Na, W, Fe, Zn, B, Si, P, Zr, Nb, and Al, as represented by the formula to be described below. A method of blending an element M in a composite hydroxide is not particularly limited, a known method can be used, and for example, from the viewpoint of enhancing productivity, a method is preferable in which an aqueous solution containing an element M is added to a mixed aqueous solution containing nickel and manganese and a composite hydroxide containing the element M is coprecipitated.

As the aqueous solution containing the element M, for example, aqueous solutions containing cobalt sulfate, vanadium oxychloride, vanadium oxysulfate, magnesium sulfate, magnesium chloride, molybdenum chloride, calcium chloride, chromium chloride, sodium tantalate, sodium hydroxide, sodium tungstate, tungsten oxide, ferrous sulfate, zinc chloride, zinc sulfate, boric acid, ammonium borate, silicon bromide, phosphoric acid, zirconium sulfate, zirconium nitrate, niobium hydroxide, niobium pentachloride, niobic acid, aluminum sulfate, sodium aluminate, and the like can be used.

Furthermore, from the viewpoint of optimizing the crystallization conditions to facilitate control of the composition ratio, after particles of composite hydroxide are obtained by crystallization, a step of coating the obtained composite hydroxide with the element M may be further provided. A method for coating the element M is not particularly limited, and a known method can be used.

An example of the method for coating the element M will be described below. First, the nickel-manganese composite hydroxide obtained by crystallization is dispersed in pure water to form a slurry. Next, this slurry is mixed with a solution containing the element M in an amount corresponding to the intended amount of coverage, and an acid or alkali is added dropwise to the mixture to adjust the pH to a predetermined value. As the acid, for example, sulfuric acid, hydrochloric acid, nitric acid, or the like is used. As the alkali, for example, sodium hydroxide, potassium hydroxide, or the like is used. Next, the slurry is mixed for a predetermined time and then the slurry is filtered and dried, thereby a nickel-manganese composite hydroxide coated with the element M can be obtained. Note that, examples of other coating methods include a spray drying method in which a solution containing a compound containing the element M is sprayed onto the nickel-manganese composite hydroxide and then dried, and a method in which the nickel-manganese composite hydroxide is impregnated with a solution containing a compound containing the element M.

Note that, the method of blending the element M in a nickel-manganese composite hydroxide may include one or both of mixing the element M in the mixed aqueous solution and coating the composite hydroxide with the element M, and for example, 1) a nickel-manganese composite hydroxide obtained by adding an alkaline aqueous solution to a mixed aqueous solution containing nickel and manganese (excluding the element M) and subjecting the mixture to crystallization may be coated with the element M or 2) a mixed aqueous solution containing nickel, manganese, and a part of the element M is prepared, a nickel-manganese composite hydroxide (containing the element M) is coprecipitated, the coprecipitate is coated with the element M, and the content of M may be adjusted.

Note that, the crystallization step (Si) may use 1) a method by batch-type crystallization (a batch-type crystallization method) or may use 2) a method by continuous crystallization (a continuous crystallization method). For example, in the case of a batch-type crystallization method, the precipitate is collected, filtered, and washed with water after the reaction aqueous solution in the reaction tank has reached a steady state to obtain a composite hydroxide. Furthermore, in the case of a continuous crystallization method, a mixed aqueous solution, an alkaline aqueous solution, and in some cases, an aqueous solution containing an ammonium ion supplier are continuously supplied and allowed to overflow the reaction tank to collect the precipitate, and the precipitate is filtered and washed with water to obtain a composite hydroxide.

In the method for producing a positive electrode active material according to the present embodiment, from the viewpoint of obtaining a positive electrode active material showing a high volume energy density when used for a secondary battery, it is preferable to use a continuous crystallization method. In the production by continuous crystallization, a positive electrode active material having a high particle size distribution width, a broad spread of particle size distribution, and a high filling property can be easily obtained. Furthermore, the continuous crystallization method provides higher productivity than batch-type crystallization and is suitable for industrial-scale production.

[Heat Treatment Step (S2)]

As illustrated in FIG. 5(B), the composite hydroxide obtained by the crystallization step (S1) may be further subjected to the heat treatment step (S2). The heat treatment step (S2) is a step of removing at least a part of moisture contained in the composite hydroxide by heat treatment. By providing the heat treatment step (S2), it is possible to prevent variations in Li/Me in the positive electrode active material obtained in the firing step (S20) to be described below by removing at least a part of moisture remaining in the composite hydroxide.

From the viewpoint of further reducing the variation in Li/Me, the heat treatment in the heat treatment step (S2) is preferably performed such that the composite hydroxide is sufficiently oxidized and converted into composite oxide particles. Note that, in the heat treatment step, it is only required to remove moisture to an extent to which Li/Me of the positive electrode active material does not vary, and thus it is not necessarily required to convert all the hydroxides (composite hydroxides) in the composite hydroxide to composite oxides. That is, by subjecting the composite hydroxide to the heat treatment, a nickel-manganese composite compound containing at least one of a nickel-manganese composite hydroxide and a nickel-manganese composite oxide can be obtained.

Furthermore, when the heat treatment step (S2) is performed, as illustrated in FIG. 5(B), the nickel-manganese composite compound obtained by the heat treatment step (S2) may be used in the mixing step (S10). Furthermore, when the composite hydroxide contains the element M, the heat treatment step (S2) may be performed after the composite hydroxide is coated with a compound containing the element M, or the particles of the composite hydroxide and/or the composite oxide after the heat treatment step (S2) may be coated with a compound containing the element M.

The heat treatment of the heat treatment step (S2) may be performed by heating the composite hydroxide to a temperature at which remaining water in the composite hydroxide is removed, and for example, the temperature for the heat treatment is preferably set to 105° C. or higher and 700° C. or lower. When the composite hydroxide is heated at 105° C. or higher, at least a part of remaining water can be removed. Note that, it is not industrially suitable that the temperature for the heat treatment is lower than 105° C. since it takes a long time to remove the remaining water. On the other hand, when the temperature for the heat treatment exceeds 700° C., the particles converted into the composite oxide particles may be sintered and aggregated. For example, when most of the composite hydroxide is converted into composite oxide particles, the temperature for the heat treatment is preferably set to 350° C. or higher and 700° C. or lower.

The atmosphere in which the heat treatment is performed is not particularly limited, and for example, it is preferable that the thermal treatment is performed in an air flow from the viewpoint of easy operation. Furthermore, the time for the heat treatment is not particularly limited and can be set to, for example, 1 hour or longer. When the time for the heat treatment is shorter than 1 hour, remaining water in the composite hydroxide may not be sufficiently removed. Furthermore, the time for the heat treatment is preferably 5 hours or longer and 15 hours or shorter. Furthermore, the equipment to be used for the heat treatment is not particularly limited, is only required to heat the composite hydroxide in an air flow, and for example, a fan drying machine and an electric furnace that does not generate gas can be suitably used.

Note that, in FIG. 5(B), the nickel-manganese composite hydroxide after the crystallization step (S1) is subjected to the heat treatment, but the nickel-manganese composite hydroxide obtained in a step other than the crystallization step (S1) is subjected to the heat treatment to obtain a nickel-manganese composite compound, and the nickel-manganese composite compound may be used in the mixing step (S10). Even in this case, by removing at least a part of moisture in the nickel-manganese composite hydroxide, the aforementioned effect can be obtained.

[Mixing Step (S10)]

The nickel-manganese composite compound to be used in the mixing step (S10) contains nickel (Ni), manganese (Mn), and arbitrarily, an element M (M) that is at least one element selected from the group consisting of Co, V, Mg, Mo, Ca, Cr, Ta, Na, W, Fe, Zn, B, Si, P, Zr, Nb, and Al as metal elements, and the mole number ratio of these metal elements is represented as Ni:Mn:M=1-x-y:x:y, provided that $0.03 \leq x \leq 0.15$ and $0 \leq y \leq 0.15$.

Since the contents (composition) of the respective elements (Ni, Mn, and M) in the nickel-manganese composite compound are almost maintained also in the lithium-nickel-manganese composite oxide particles, the contents of the respective elements (Ni, Mn, and the element M) are preferably in the same range as the contents in the lithium-nickel-manganese composite oxide described above. Note that, the nickel-manganese composite compound to be used in the present embodiment may contain an element other than the aforementioned respective elements (Ni, Mn, and the element M), hydrogen, and oxygen at a small amount in the range that does not impair the effect of the present invention.

The nickel-manganese composite compound contains manganese in the above range, and thereby manganese can be uniformly distributed in a plurality of primary particles of a positive electrode active material to be obtained. The positive electrode active material in which manganese and titanium are contained (solid-solved) in the plurality of primary particles has high thermal stability, volume resistivity is increased, and short circuit resistance is improved.

Furthermore, it is possible to fire the lithium-titanium mixture at a relatively high temperature by containing manganese in the primary particles. Furthermore, by performing firing at a high temperature, titanium in the titanium compound can be more uniformly solid-solved in the primary particles.

The method for producing a nickel-manganese composite compound is not particularly limited, and as illustrated in FIG. 5(A) and FIG. 5(B), it is preferable to use the composite hydroxide and/or the composite oxide obtained by the crystallization step (S1) and/or the heat treatment step (S2), and it is more preferable to use the nickel-manganese composite hydroxide obtained by the crystallization step (S1). Thereby, in the firing step (S20) to be described below, it is possible to easily obtain a lithium-nickel-manganese composite oxide in which titanium is solid-solved in primary particles.

Note that, it is preferable that, in the nickel-manganese composite compound, each of nickel and manganese is uniformly contained in the particles. For example, when mixtures obtained by separately mixing nickel hydroxide particles and a manganese compound, nickel hydroxide particles coated with a manganese compound, and the like are used as raw materials, the distribution of manganese in a positive electrode active material to be obtained becomes non-uniform, and thus an effect obtained by containing manganese may not be sufficiently obtained.

(Titanium Compound)

As the titanium compound to be used in the mixing step (S10), a known compound containing titanium can be used, and for example, titanium oxide, titanium sulfate, titanium tetrabromide, titanium tetrachloride, titanium silicide, or the like can be used. Note that, the titanium compound may be used singly, or two or more kinds thereof may be used.

Among these, titanium oxide is preferable from the viewpoint of easy availability and of avoiding mixing of impurities into the lithium-nickel-manganese composite oxide. Note that, when impurities are mixed into the lithium-nickel-manganese composite oxide, decreases in thermal stability, battery capacity, and cycle characteristics of the secondary battery to be obtained may be caused.

The titanium compound is preferably mixed as particles (solid phase). When titanium is added as a solid phase, the reactivity in the subsequent firing step (S20) changes depending on the particle size of the titanium compound, and thus the particle size of the titanium compound to be used is one of the important factors.

The average particle size of the titanium compound is preferably 0.01 μm or more and 5 μm or less, more preferably 0.05 μm or more and 3 μm or less, and further preferably 0.08 μm or more and 3 μm or less. When the average particle size is smaller than 0.01 μm, problems may arise that it is significantly difficult to handle the powder and the titanium compound scatters and the intended composition cannot be imparted to the active material in the mixing step (S10) and the firing step (S20). On the other hand, when the average particle size is larger than 5 μm, titanium may not be uniformly distributed in the lithium-nickel-manganese composite oxide after firing and a battery capacity may be decreased. Note that, the average particle size is a volume average particle diameter Mv and can be determined from, for example, a volume integrated value measured by a laser diffraction/scattering type particle size distribution analyzer.

The titanium compound may be pulverized in advance so as to have a particle size in the above range by using various pulverizers such as ball mill, planetary ball mill, jet mill/nano jet mill, bead mill, and pin mill. Furthermore, the titanium compound may be classified by a dry classifier or sieving as necessary. For example, particles close to 1 μm can be obtained using a dry classifier.

(Lithium Compound)

The lithium compound is not particularly limited, and a known compound containing lithium can be used, and for example, lithium carbonate, lithium hydroxide, lithium nitrate, or a mixture thereof is used. Among these, lithium carbonate, lithium hydroxide, or a mixture thereof is preferable from the viewpoint of being less affected by remaining impurities and melting at the firing temperature.

(Mixing Method)

The method for mixing the nickel-manganese composite compound, the lithium compound, and the titanium compound is not particularly limited, and it is only required that the composite hydroxide, the lithium compound, and the titanium compound are sufficiently mixed with each other to the extent to which the skeletons of the composite hydroxide and the like are not destroyed. As the mixing method, for example, mixing can be performed using a general mixer, and for example, mixing can be performed using a shaker mixer, a Loedige mixer, a *Julia* mixer, a V blender, and the like. Note that, it is preferable to sufficiently mix the lithium-titanium mixture before the firing step to be described later. When mixing is not sufficiently performed, the mole number ratio (Li/Me, corresponding to "a" in the mole number ratio to be described, atomic percent ratio) of Li to the elements Me (that is, Ni+Mn+the element M+Ti) other than Li may vary between the individual particles of the positive electrode active material and a problem may arise that sufficient battery characteristics are not attained.

The lithium compound is mixed so that Li/Me in the lithium-titanium mixture is 0.97 or more and 1.25 or less. In other words, the lithium compound is mixed so that Li/Me in the lithium-titanium mixture is the same as Li/Me in the positive electrode active material to be obtained. This is because Li/Me in the lithium-titanium mixture at the time of mixing becomes Li/Me in the positive electrode active material since Li/Me and the molar ratio of the respective metal elements do not change before and after the firing step (S20) to be described below. Furthermore, for example, the crystallite diameter of the lithium-nickel-manganese composite oxide obtained after firing can be adjusted by adjusting a value of Li/Me in the mixture.

The titanium compound is mixed so that the ratio (Ti/Me) of titanium mole number (Ti) in the lithium-titanium mixture is 0.01 or more and 0.05 or less with respect to the sum of metal elements (Ni, Mn, the element M, and Ti) other than Li in the lithium-titanium mixture.

[Firing Step (S20)]

The firing step (S20) is a step of firing the lithium-titanium mixture obtained in the mixing step (S10) in an oxidizing atmosphere having an oxygen concentration of 80 vol % or more and 100 vol % or less at 700° C. or higher and 950° C. or lower to obtain a lithium-nickel-manganese composite oxide.

When the lithium-titanium mixture is fired, lithium in the lithium compound is diffused in particles of the nickel-manganese composite compound, and thereby particles (secondary particle) of the lithium-nickel-manganese composite oxide configured by polycrystal structure particles are formed. The lithium compound melts at a temperature at the time of firing and penetrates into particles of the nickel-manganese composite compound to form a lithium-nickel-manganese composite oxide. At this time, the titanium compound penetrates into the inside of the secondary particles together with the molten lithium compound. Furthermore, if there are crystal grain boundaries and the like also in the primary particles, the titanium compound penetrates thereinto. The lithium compound and the titanium compound penetrate to promote the diffusion inside the primary particles, and thus titanium is uniformly solid-solved in the primary particles. As a result of studies of the present inventors, for example, by controlling the oxygen concentration and the firing temperature in the firing atmosphere, titanium is uniformly solid-solved inside the primary particles, and precipitation as a titanium compound phase or segregation to the interface between primary particles is suppressed.

As for the firing atmosphere, the oxygen concentration is 80 vol % or more and 100 vol % or less, and the oxygen concentration is preferably 90 vol % or more and 100 vol % or less. In the lithium-nickel-manganese composite oxide having a high nickel ratio, so-called cationic mixing in which a transition metal element such as Ni is arranged in the Li site in the layered compound is likely to occur. Furthermore, the crystallinity of the layered compound is decreased, and the disarrangement of atomic distribution is likely to occur. Due to the disarrangement of these structures, titanium cannot be solid-solved at the Me site (transition metal site) so as to be precipitated as an impurity phase (heterophase) such as a titanium compound, and thus there is a concern that a battery capacity is decreased. On the other hand, when firing is performed in the above oxygen concentration range, the phase transition to the layered compound of the lithium-nickel-manganese composite oxide is promoted, and titanium is easily solid-solved at the transition metal site in the layered compound. Therefore, even in the above titanium content range, titanium can be uniformly solid-solved into the primary particles without precipitating the impurity phase. Thereby, it is possible to obtain a positive electrode active material with an improved battery capacity and a decreased volume resistivity while maintaining high thermal stability in which both the battery characteristics and short circuit resistance and the thermal stability are achieved.

The firing temperature is 700° C. or higher and 950° C. or lower, preferably 700° C. or higher and 900° C. or lower, and may be 750° C. or higher and 850° C. or lower in an oxidizing atmosphere. When firing is performed at the above temperature, melting of the lithium compound occurs to promote penetration and diffusion of titanium. Furthermore, the lithium-titanium mixture contains manganese so that the firing temperature can be increased. By increasing the firing temperature, diffusion of titanium is promoted, titanium is easily solid-solved in the particles of the lithium-nickel-manganese composite oxide, and thus both high thermal stability and high battery capacity can be achieved. Furthermore, in the water-washing and drying step (S30, S40) to be described later, the crystallite diameter of the lithium-nickel-manganese composite oxide finally obtained can be adjusted by appropriately adjusting the firing temperature within the above range in consideration of an increase in the crystallite diameter at the (003) plane.

On the other hand, when the firing temperature is lower than 700° C., diffusion of lithium and titanium into the composite hydroxide is not sufficiently performed, excessive lithium or unreacted particles may remain or the crystal structure may not be sufficiently arranged, so that a problem arises that sufficient battery characteristics are not obtained. Furthermore, solid-solving of titanium into the primary particles becomes insufficient, and thus sufficient short circuit resistance and thermal stability may not be obtained. Furthermore, when the firing temperature exceeds 950° C., there is the possibility that sintering violently occurs between the particles of the formed lithium-nickel-manganese composite oxide and abnormal grain growth occurs. When abnormal grain growth occurs, the particles may be too coarse after firing so as to decrease a filling property when the positive electrode active material is formed, and further, problems arise that the reaction resistance due to the disarrangement of the crystal structure is increased and the discharge capacity decreases.

The firing time is set to preferably at least 3 hours or longer and more preferably 6 hours or longer and 24 hours or shorter. When the firing time is shorter than 3 hours, the lithium-nickel-manganese composite oxide may not be sufficiently generated. Furthermore, a furnace used for firing is not particularly limited as long as a lithium-titanium mixture can be fired in an oxygen flow, an electric furnace without gas generation is preferably used, and either of a batch-type furnace or a continuous furnace can be used.

[Calcination]

The firing step may further include a step of performing calcination at a temperature lower than the firing temperature before firing at a temperature of 700° C. or higher and 950° C. or lower. The calcination is preferably performed at a temperature at which the lithium compound in the lithium-titanium mixture may be melt and may react with the composite hydroxide. The temperature for calcination can be set, for example, to 350° C. or higher, and can be set to a temperature lower than the firing temperature. Furthermore, the lower limit of the temperature for calcination is preferably 400° C. or higher. When the lithium-titanium mixture is held (calcined) in the above temperature range, the lithium compound and/or the titanium compound penetrates into particles of the nickel-manganese composite compound, the diffusion of lithium and titanium is sufficiently performed, and thus a uniform lithium-nickel-manganese composite oxide can be obtained. For example, when lithium hydroxide is used as the lithium compound, it is preferable to perform calcination while holding the lithium-titanium mixture at a temperature of 400° C. or higher and 550° C. or lower for 1 hour or longer and about 10 hours.

[Crushing]

In the lithium-nickel-manganese composite oxide obtained after the firing step (S20), sintering between particles is suppressed but coarse particles may be formed by weak sintering and aggregation. In such a case, the particle size distribution can be adjusted by eliminating the sintering and aggregation by crushing. The method for crushing is not particularly limited, but the specific surface area of the lithium-nickel-manganese composite oxide can be increased by sufficiently disentangling the sintering and aggregation by crushing.

[Water-Washing Step (S30)]

The water-washing step (S30) is a step of mixing the lithium-nickel-manganese composite oxide obtained in the firing step (S20) and water and stirring the mixture (hereinafter, referred to as "stirring with water") so as to perform solid-liquid separation.

The production method according to the present embodiment includes the water-washing step (S30) and the drying step (S40) to be described below, and thereby the disarrangement of atomic arrangement in the positive electrode active material is alleviated to improve crystallinity. Furthermore, excessive lithium present on the particle surface or at the grain boundary of the lithium-nickel-manganese composite oxide is eluted into water, and thereby the specific surface area is increased. Although details are not clear, it is considered that the overvoltage at the time of discharge is reduced by these effects to improve the discharge capacity.

Note that, as described above, when the positive electrode active material does not contain titanium, crystallinity is not improved and further, the reaction resistance increases although the specific surface area increases, so that discharge capacity does not increase even when water-washing is performed. The reason for this is not clear in detail, but in the positive electrode active material according to the present embodiment, titanium solid-solved inside the primary particles may have an effect of suppressing deterioration of the particle surface and grain boundary due to elution of lithium. Furthermore, by the water-washing step (S30), excessive lithium components on the surface are dissolved in water to be removed, and thereby the gelling of a positive electrode mixture paste at the time of producing an electrode plate of a secondary battery can be suppressed.

The amount of water to be mixed in the water-washing step (S30) is preferably 50 parts by mass or more and 200 parts by mass or less with respect to 100 parts by mass of the lithium-nickel-manganese composite oxide. When the mixing ratio of water is 200 parts by mass or more, an excessive amount of lithium is pulled out from the positive electrode active material, so that a decrease in a battery capacity or an increase in reaction resistance may occur. On the other hand, when the mixing ratio of water is less than 50 parts by mass, there is the possibility that the effect of improving crystallinity or removal of excessive lithium components is insufficient, so that a decrease in battery capacity or the gelling of the positive electrode mixture paste occurs.

The time for water-washing is not particularly limited, and for example, is about 1 minute or longer and 2 hours or shorter, and may be 5 minutes or longer and 50 minutes or shorter.

After the lithium-nickel-manganese composite oxide is stirred with water, solid-liquid separation is performed to obtain a lithium-nickel-manganese composite oxide (precipitate). A solid-liquid separation method is not particularly limited, and a known method can be used. For example, solid-liquid separation can be performed using one or more kinds selected from a suction filter such as a Nutsche (a Buchner funnel), a filter press, a centrifugal separator, and the like.

[Drying Step (S40)]

The drying step (S40) is a step of drying the lithium-nickel-manganese composite oxide (precipitate) obtained by the water-washing step (S30) to obtain powder (dry powder) of the lithium-metal composite oxide.

Regarding drying conditions, heat treatment is preferably performed in an oxidizing atmosphere or in a vacuum atmosphere at a temperature of 100° C. or higher and 250° C. or lower. When the drying temperature is 100° C. or higher, moisture in the precipitate can be sufficiently evaporated. Furthermore, when the drying temperature is 250° C. or lower, a compact drying apparatus can be used, which is suitable for industrial-scale implementation.

An atmosphere when drying is preferably an atmosphere not containing water vapor or carbon dioxide, and specifically, an oxidizing atmosphere such as an oxygen atmosphere or a vacuum atmosphere is preferable in order to avoid a reaction between moisture or carbonic acid in the atmosphere and a positive electrode active material to be obtained. Furthermore, from the viewpoint that water vapor generated by drying can be rapidly discharged, it is preferable to attach an exhaust system to a drying apparatus.

The drying time is not particularly limited, but in order to sufficiently evaporate moisture of a raw material mixture, the drying time at the maximum attained temperature when drying is set to preferably 0.5 hours or longer. Furthermore, the upper limit of the drying time is set to preferably 48 hours or shorter from the viewpoint of productivity.

[Positive Electrode Active Material]

According to the positive electrode active material obtained by the production method according to the present embodiment, when the positive electrode active material is used for a positive electrode of a lithium ion secondary battery, both high battery characteristics and high thermal stability can be achieved at a high level. Furthermore, the production method according to the present embodiment can produce such a positive electrode active material easily in industrial scale production, and is considered to be extremely industrially valuable.

Furthermore, the crystallite diameter at the (003) plane of the lithium-nickel-manganese composite oxide (positive electrode active material) obtained after the drying step (S40) is further increased as compared to the crystallite diameter at the (003) plane of the lithium-nickel-manganese composite oxide obtained after the firing step (S20) and before the water-washing step (S30). The crystallite diameter at the (003) plane of a positive electrode active material to be obtained may be increased by 15 nm or more or may be increased by 20 nm or more, for example, as compared to that before the water-washing step (S30). When the crystallite diameter at the (003) plane is increased after the water-washing step (S30), a battery capacity when a positive electrode active material to be obtained is used for a secondary battery can be improved. Although the details of the reason for this are not clear, for example, the reason for this is considered that, when lithium in the lithium-nickel-manganese composite oxide is pulled out by the water-washing step (S30), the disarrangement of atomic arrangement is alleviated so that the diffraction peak of the XRD measurement becomes sharp and the crystallite diameter is apparently increased. Furthermore, an increase in crystallite diameter at the (003) plane becomes significant particularly in a lithium-nickel-manganese composite oxide containing a specific amount of titanium.

3. Lithium Ion Secondary Battery

The lithium ion secondary battery (hereinafter, also referred to as "secondary battery") according to the present embodiment includes a positive electrode containing the positive electrode active material described above, a negative electrode, and a non-aqueous electrolyte. The secondary battery includes, for example, a positive electrode, a negative electrode, and a non-aqueous electrolyte solution. Furthermore, the secondary battery may include, for example, a positive electrode, a negative electrode, and a solid electrolyte. Furthermore, the secondary battery may be any secondary battery which is charged and discharged by de-insertion and insertion of lithium ions and may be, for example, a non-aqueous electrolyte solution secondary battery or an all-solid-state lithium secondary battery. Note that, the embodiments described below are merely examples, and the lithium ion secondary battery can be implemented in various modified and improved forms based on the knowledge of those skilled in the art including the following embodiments. Furthermore, the use of the secondary battery is not particularly limited.

[Positive Electrode]

A positive electrode of a secondary battery is produced using the positive electrode active material described above. An example of a method for producing the positive electrode will be described below.

First, the above positive electrode active material (powder shape), a conductive material, and a binding agent (binder) are mixed, activated carbon and an intended solvent for viscosity adjustment or the like are further added as necessary, and the resulting mixture is kneaded to prepare a positive electrode mixture paste.

The mixing ratio of the respective materials in the positive electrode mixture is a factor that determines the performance of the lithium ion secondary battery and thus can be adjusted according to the use. The mixing ratio of the materials can be similar to that of the positive electrode of a known lithium secondary battery, and for example, when the entire mass of the solids in the positive electrode mixture excluding the solvent is 100% by mass, the positive electrode active material can be contained at 60% to 95% by mass, the conductive material can be contained at 1% to 20% by mass, and the binding agent can be contained at 1% to 20% by mass.

The obtained positive electrode mixture paste is applied to, for example, a surface of an aluminum foil current collector and dried to scatter the solvent, and a sheet-like positive electrode is thereby produced. Pressurization may be performed by roll press or the like in order to increase an electrode density as necessary. The sheet-like positive electrode thus obtained can be cut into a proper size according to an intended battery and used in production of a battery. However, a method for producing the positive electrode is not limited to the above-exemplified method, and other methods may be used.

As the conductive material, for example, graphite (natural graphite, artificial graphite, expanded graphite, and the like), and a carbon black-based material such as acetylene black or ketjen black can be used.

The binding agent (binder) plays a role of connecting active material particles together, and for example, polyvinylidene fluoride (PVDF), polytetrafluoroethylene (PTFE), fluororubber, ethylene propylene diene rubber, styrene butadiene, a cellulose-based resin, polyacrylic acid, and the like can be used.

A solvent which disperses the positive electrode active material, the conductive material, and the activated carbon and dissolves the binding agent is added to the positive electrode mixture as necessary. As the solvent, specifically, an organic solvent such as N-methyl-2-pyrrolidone can be used. Furthermore, the activated carbon can be added to the positive electrode mixture in order to increase electric double layer capacity.

[Negative Electrode]

As the negative electrode, metal lithium, a lithium alloy, and the like can be used. Furthermore, as the negative electrode, a negative electrode may be used which is formed by mixing a binding agent with a negative electrode active material which can insert and de-insert lithium ions, adding a proper solvent thereto to form a paste-like negative electrode mixture, applying the paste-like negative electrode mixture to the surface of a metal foil current collector such as copper, drying the negative electrode mixture, and compressing the negative electrode mixture in order to increase the electrode density as necessary.

Examples of the negative electrode active material include natural graphite, artificial graphite, a fired organic compound such as a phenol resin, and a powdery carbon material such as coke. In this case, as a negative electrode binding agent, a fluorine-containing resin such as PVDF can be used as in the positive electrode, and as a solvent for dispersing the active material and the binding agent, an organic solvent such as N-methyl-2-pyrrolidone can be used.

[Separator]

A separator is disposed by being interposed between the positive electrode and the negative electrode. The separator separates the positive electrode and the negative electrode from each other and retains the electrolyte, a known separator can be used, and for example, a thin film such as polyethylene or polypropylene having a large number of minute pores can be used.

[Non-Aqueous Electrolyte]

As the non-aqueous electrolyte, for example, a non-aqueous electrolyte solution can be used.

The non-aqueous electrolyte solution is obtained by dissolving a lithium salt as a supporting salt in an organic solvent. Furthermore, as the non-aqueous electrolyte solution, a solution obtained by dissolving a lithium salt in an ionic liquid may be used. Note that, the ionic liquid refers to a salt including a cation other than a lithium ion and including an anion, and being in a liquid state even at room temperature.

As the organic solvent, one selected from the group consisting of cyclic carbonates such as ethylene carbonate, propylene carbonate, butylene carbonate, and trifluoropropylene carbonate, chain carbonates such as diethyl carbonate, dimethyl carbonate, ethyl methyl carbonate, and dipropyl carbonate, further, ether compounds such as tetrahydrofuran, 2-methyltetrahydrofuran, and dimethoxyethane, sulfur compounds such as ethyl methyl sulfone and butane sultone, and phosphorus compounds such as triethyl phosphate and trioctyl phosphate can be used singly, or two or more of these can be used in mixture.

As the supporting salt, $LiPF_6$, $LiBF_4$, $LiClO_4$, $LiAsF_6$, $LiN(CF_3SO_2)_2$, a composite salt thereof, and the like can be used. Furthermore, the non-aqueous electrolyte solution may contain a radical scavenger, a surfactant, a flame retardant, and the like.

As the non-aqueous electrolyte, a solid electrolyte may also be used. The solid electrolyte has a property of withstanding a high voltage. Examples of the solid electrolyte include inorganic solid electrolytes and organic solid electrolytes.

Examples of the inorganic solid electrolytes include oxide-based solid electrolytes and sulfide solid electrolytes.

The oxide-based solid electrolyte is not particularly limited, and for example, one that contains oxygen (O) and exhibits lithium ion conductivity and electron insulating property can be suitably used. As the oxide-based solid electrolyte, for example, one or more selected from lithium phosphate ($Li_3PO_4$), $Li_3PO_4N_X$, $LiBO_2N_X$, $LiNbO_3$, $LiTaO_3$, $Li_2SiO_3$, $Li_4SiO_4$—$Li_3PO_4$, $Li_4SiO_4$—$Li_3VO_4$, $Li_2O$—$B_2O_3$—$P_2O_5$, $Li_2O$—$SiO_2$, $Li_2O$—$B_2O_3$—$ZnO$, $Li_{1+X}Al_XTi_{2-X}(PO_4)_3$ ($0 \leq X \leq 1$), $Li_{1+X}Al_XGe_{2-X}(PO_4)_3$ ($0 \leq X \leq 1$), $LiTi_2(PO_4)_3$, $Li_{3X}La_{2/3-X}TiO_3$ ($0 \leq X \leq 2/3$), $Li_5La_3Ta_2O_{12}$, $Li_7La_3Zr_2O_{12}$, $Li_6BaLa_2Ta_2O_{12}$, $Li_{3.6}Si_{0.6}P_{0.4}O_4$, and the like can be used.

The sulfide solid electrolyte is not particularly limited, and for example, one that contains sulfur (S) and exhibits lithium ion conductivity and electron insulating property can be suitably used. As the sulfide solid electrolyte, for example, one or more selected from $Li_2S$—$P_2S_5$, $Li_2S$—$SiS_2$, $LiI$—$Li_2S$—$SiS_2$, $LiI$—$Li_2S$—$P_2S_5$, $LiI$—$Li_2S$—$B_2S_3$, $Li_3PO_4$—$Li_2S$—$Si_2S$, $Li_3PO_4$—$Li_2S$—$SiS_2$, $LiPO_4$—$Li_2S$—$SiS$, $LiI$—$Li_2S$—$P_2O_5$, $LiI$—$Li_3PO_4$—$P_2S_5$, and the like can be used.

Note that, as the inorganic solid electrolyte, ones other than the above-described inorganic solid electrolytes may be used, and for example, $Li_3N$, $LiI$, $Li_3N$—$LiI$—$LiOH$, and the like may be used.

The organic solid electrolyte is not particularly limited as long as it is a polymer compound that exhibits ionic conductivity, and for example, polyethylene oxide, polypropylene oxide, and copolymers of these can be used. Furthermore, the organic solid electrolyte may contain a supporting salt (lithium salt).

Note that, it is also possible to constitute a secondary battery by using a solid electrolyte instead of the non-aqueous electrolyte solution. The solid electrolyte is not decomposed even at a high potential, therefore does not cause gas generation or thermal runaway due to decomposition of the electrolyte solution at the time of charge, as observed in a non-aqueous electrolyte solution, and thus exhibits high thermal stability. For this reason, when the positive electrode active material according to the present invention is used for a lithium ion secondary battery, a secondary battery exhibiting higher thermal stability can be obtained.

[Shape and Configuration of Secondary Battery]

The configuration of the secondary battery is not particularly limited, and as described above, the secondary battery may include a positive electrode, a negative electrode, a separator, a non-aqueous electrolyte, and the like, or may include a positive electrode, a negative electrode, a solid electrolyte, and the like. Furthermore, the shape of the secondary battery is not particularly limited, and the secondary battery can be formed into various shapes such as a cylindrical shape and a stacked shape.

For example, when the secondary battery is a non-aqueous electrolyte solution secondary battery, a positive electrode and a negative electrode are stacked with a separator interposed therebetween to form an electrode body, the obtained electrode body is impregnated with a non-aqueous electrolyte solution, a positive electrode collector is connected to a positive electrode terminal communicating with the outside using a current collecting lead or the like, a negative electrode collector is connected to a negative electrode terminal communicating with the outside using a current collecting lead or the like, and the resulting product is sealed in a battery case to complete the secondary battery.

Note that, the secondary battery according to the present embodiment is not limited to a form in which a non-aqueous electrolyte solution is used as a non-aqueous electrolyte but can be formed into, for example, a secondary battery using a solid non-aqueous electrolyte, that is, an all-solid-state battery. When the secondary battery according to the present embodiment is formed into the all-solid-state battery, the components other than the positive electrode active material can be changed as necessary.

The secondary battery according to the present embodiment can achieve high thermal stability at low cost. Furthermore, the positive electrode active material to be used for the secondary battery can be obtained by the industrial production method as described above. Furthermore, the secondary battery is suitable for a power source of a small portable electronic device (such as a notebook personal computer or a mobile phone terminal) that is required to have a high capacity all the time. Furthermore, the secondary battery is superior not only in capacity but also in durability and thermal stability at the time of overcharge to a battery fabricated using a conventional positive electrode active material of a lithium-cobalt-based oxide or lithium-nickel-based oxide. Hence, the secondary battery is suitably used as a power source for electric cars that are restricted in a mounting space since microminiaturization and capacity enlargement thereof are possible. Note that, the secondary battery can be used not only as a power source for an electric car driven purely by electric energy but also as a power source for a so-called hybrid car used together with a combustion engine such as a gasoline engine or a diesel engine.

EXAMPLES

Hereinafter, the present invention will be described in more detail with reference to Examples and Comparative Examples of the present invention, but the present invention is not limited to these Examples at all. Note that various evaluation methods for a positive electrode active material in each of Examples and Comparative Examples are as follows.

(A) Analysis of composition: Measured by ICP emission spectrometry.

(B) Qualitative assessment of crystal structure and presence/absence of impurity phase and calculation of crystallite diameter at (003) plane:

Evaluation was performed by the XRD diffraction pattern using Cu-Kα rays using an XRD diffractometer (X'Pert PRO manufactured by PANalytical). The measurement conditions were as follows: the output was 45 kV and 40 mA, the step size was 0.0168°, and the scan speed was 0.0508°/sec.

The presence/absence of a heterophase other than the hexagonal layered structure and the peak intensity ratio ($I_{Ti\ compound}/I_{(003)}$) were determined from the diffraction pattern. Note that, a peak equal to or lower than the detection limit was calculated assuming that the peak intensity thereof was regarded as 0. Specifically, in Comparative Examples to be described below, when $LiTiO_2$ was detected as a Ti compound, the peak intensity ratio was determined as ($I_{LiTiO2}/I_{(003)}$) using the (200) diffraction peak intensity $I_{LiTiO2}$ that is the most intense peak of LiTiO2. Herein, the position of the (200) diffraction peak that is the most intense peak of $LiTiO_2$ is near 2θ=43.7°, and the position of the (003) diffraction peak that is the most intense peak of the hexagonal layered structure is near 2θ=18.7°.

Furthermore, the (003) crystallite diameter was determined by Scherrer's calculus equation from the (003) full width at half maximum of the hexagonal layered structure thus obtained.

(C) Eluted lithium amount: A supernatant fluid, which was obtained after 20 g of the positive electrode active material was collected, put into 100 ml of pure water set at 25° C., and immersed and stirred for 30 minutes, and the resulting solution was left to stand still for 10 minutes, was titrated using an HCl aqueous solution. The titration was evaluated by the Warder method, lithium hydroxide (LiOH) and lithium carbonate ($Li_2CO_3$) were calculated, and the sum of these lithium amounts was calculated as eluted lithium.

(D) Volume average particle diameter Mv, and particle size distribution width [(D90–D10)/volume average particle diameter Mv]:

Measurement was performed on a volume basis by a laser diffraction/scattering type particle size distribution measurement device (Microtrac HRA manufactured by Nikkiso Co., Ltd.).

(E) Specific surface area: Measurement was performed by a BET method based on nitrogen adsorption using a specific surface area/pore distribution measuring apparatus (Model No.: Macsorb HM1200 Series manufactured by Mountech Co., Ltd.).

Figure 6:
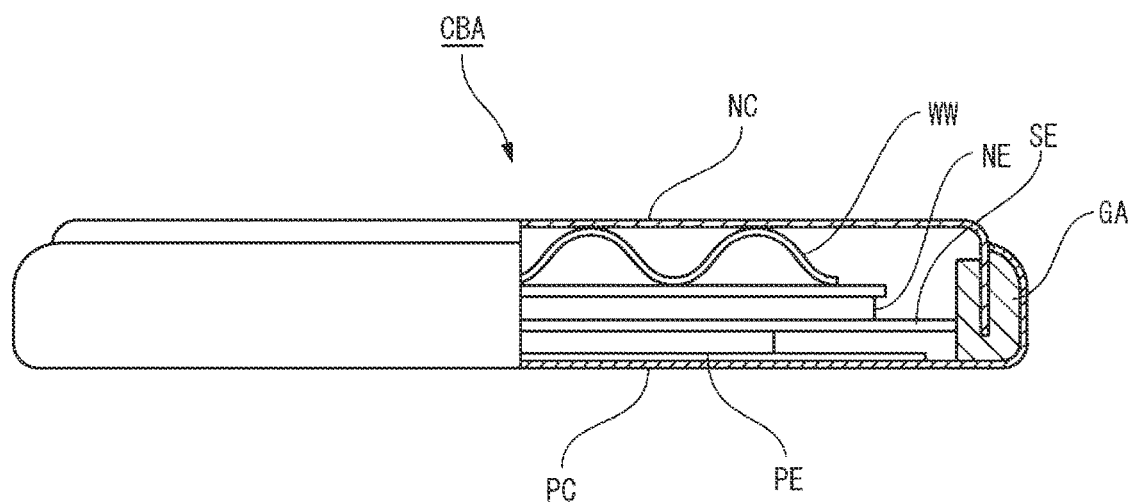
FIG. 6 is a schematic cross-sectional view of a coin-type battery used for battery evaluation.

(F) Initial charge capacity and initial discharge capacity:

With regard to the initial charge capacity and the initial discharge capacity, a 2032 type coin-type battery CBA illustrated in FIG. 6 was produced and then left to stand for about 24 hours to stabilize the open circuit voltage (OCV), then the battery was charged to a cutoff voltage of 4.3 V at a current density of 0.1 mA/cm² with respect to the positive electrode to take the capacity at this time as the initial charge capacity, the battery paused for one hour and was then discharged to a cutoff voltage of 3.0 V, and the capacity at this time was taken as initial discharge capacity. A multichannel voltage/current generator (R6741A manufactured by Advantest Corporation) was used to measure the discharge capacity.

As for the coin-type battery CBA, 52.5 mg of the positive electrode active material, 15 mg of acetylene black, and 7.5 mg of polytetrafluoroethylene resin (PTFE) were mixed and press-molded so as to have a diameter of 11 mm and a thickness of 100 μm at a pressure of 100 MPa, thereby producing a positive electrode (electrode for evaluation) PE. The positive electrode PE produced was dried in a vacuum dryer at 120° C. for 12 hours, and then a coin-type battery CBA was produced using this positive electrode PE in a glove box in an Ar atmosphere with a dew point controlled to −80° C.

As a negative electrode NE, lithium (Li) metal having a diameter of 17 mm and a thickness of 1 mm was used. As an electrolyte solution, an equal volume mixed solution (manufactured by Toyama Pharmaceutical Co., Ltd.) of ethylene carbonate (EC) and diethyl carbonate (DEC) containing 1 M $LiClO_4$ as a supporting electrolyte was used. As the separator SE, a polyethylene porous film having a thickness of 25 μm was used. Furthermore, the coin-type battery included a gasket GA and a wave washer WW, and was assembled using a positive electrode can PC and a negative electrode can NC.

(G) Thermal Stability Evaluation

The thermal stability of the positive electrode was evaluated by quantitatively determining the amount of oxygen released when the positive electrode active material in an overcharged state was heated. A coin-type battery CBA was produced in a similar manner to (E) and subjected to CC charge (constant current-constant voltage charge) at a 0.05 C rate up to a cutoff voltage of 4.3 V. Thereafter, the coin-type battery CBA was disassembled, only the positive electrode was carefully taken out so as not to cause a short circuit, washed with dimethyl carbonate (DMC), and dried. About 2 mg of the positive electrode after drying was weighed and heated from room temperature to 450° C. at a temperature increase rate of 10° C./min using a gas chromatograph mass spectrometer (GCMS, QP-2010plus manufactured by SHIMADZU CORPORATION). Helium was used as the carrier gas. The generation behavior of oxygen (m/z=32) generated at the time of heating was measured, and the semi-quantitative determination of the oxygen generation amount was performed from the obtained maximum oxygen generation peak height and peak area, and these were used as evaluation indices for thermal stability. Note that, the semi-quantitative value of the oxygen generation amount was calculated by injecting pure oxygen gas as a standard sample into GCMS and extrapolating the calibration curve attained from the measurement results.

Example 1

[Crystallization Step]

A predetermined amount of pure water was put into a reaction tank (60 L), and the temperature inside the tank was set to 49° C. while stirring the water. At this time, $N_2$ gas was allowed to flow into the reaction tank so that the dissolved oxygen concentration in the reaction tank liquid was 0.8 mg/L. A 2.0 M mixed aqueous solution of nickel sulfate, manganese sulfate, and cobalt sulfate, a 25% by mass sodium hydroxide solution as an alkaline solution, and 25% by mass of ammonia water as a complexing agent were continuously added into this reaction tank at the same time so that the molar ratio among nickel:manganese:cobalt was 85:10:5.

At the time, the flow rate was controlled so that the residence time of the mixed aqueous solution was 8 hours, the pH in the reaction tank was adjusted to 12.0 to 12.6, and the ammonia concentration was adjusted to 10 to 14 g/L. After the reaction tank was stabilized, a slurry containing nickel-manganese-cobalt composite hydroxide was collected through the overflow port and filtered to obtain a cake of nickel-manganese-cobalt composite hydroxide (crystallization step). Impurities were washed by allowing 1 L of pure water to pass through 140 g of nickel-manganese-cobalt composite hydroxide in the Denver used for filtration. The filtered powder was dried to obtain nickel-manganese-cobalt composite hydroxide particles in which a mole number ratio of nickel, manganese, and cobalt is represented as Ni:Mn:Co=0.85:0.10:0.05.

[Mixing Step]

The obtained nickel-manganese-cobalt composite hydroxide particles, lithium hydroxide, and titanium oxide ($TiO_2$) having an average particle size of 2.5 μm were weighed so that the mole number ratio of lithium:nickel:manganese:cobalt:titanium was 1.05:0.81:0.10:0.05:0.04, and then thoroughly mixed together using a shaker mixer device (TURBULA Type T2C manufactured by Willy A. Bachofen (WAB) AG) to obtain a lithium mixture.

[Firing Step]

The obtained lithium mixture was held and fired at 800° C. for 10 hours in an oxygen (oxygen concentration: 90% by volume) flow, and then was crushed to obtain lithium-nickel-manganese-cobalt-titanium composite oxide particles.

[Water-Washing Step]

Water was mixed at a ratio of 150 parts by mass with respect to 100 parts by mass of the obtained lithium-nickel-manganese-cobalt-titanium composite oxide particles, and was stirred with water for 15 minutes and then suction-filtered using a Nutsche so as to obtain a precipitate.

[Drying Step]

The obtained precipitate was put in a SUS container, heated to 100° C. for 12 hours and heated to 190° C. for 10 hours using a vacuum dryer, and left to stand still and dried so as to obtain a positive electrode active material.

[Evaluation]

The (003) crystallite diameter, the eluted lithium amount, the volume average particle diameter Mv, the particle size distribution width, and the specific surface area of the obtained positive electrode active material are presented in Table 1. As a result of XRD measurement, a heterophase (impurity phase) other than the hexagonal layered structure was not particularly confirmed. Furthermore, a coin-type battery CBA illustrated in FIG. 6 was produced, and the initial charge and discharge capacity and thermal stability were evaluated. Note that, the maximum oxygen generation peak intensity was set to a relative value with respect to Comparative Example 1 not containing titanium (a relative value when Comparative Example 1 was regarded as 100). The production conditions of the positive electrode active material thus obtained are presented in Table 1 and evaluation results are presented in Tables 2 and 3.

Example 2

A positive electrode active material was obtained and evaluated in a similar manner to Example 1, except that the firing temperature in the firing step was set to 760° C. The production conditions of the positive electrode active material thus obtained are presented in Table 1 and evaluation results are presented in Tables 2 and 3.

Example 3

A positive electrode active material was obtained and evaluated in a similar manner to Example 1, except that in the mixing step, the obtained nickel-manganese-cobalt composite hydroxide particles, lithium hydroxide, and titanium oxide ($TiO_2$) having an average particle size of 2.5 μm were weighed so that the mole number ratio of lithium:nickel:manganese:cobalt:titanium was 1.05:0.82:0.10:0.05:0.03 and the firing temperature in the firing step was set to 780° C. The production conditions of the positive electrode active material thus obtained are presented in Table 1 and evaluation results are presented in Tables 2 and 3.

Example 4

A positive electrode active material was obtained and evaluated in a similar manner to Example 3, except that the firing temperature in the firing step was set to 790° C. The production conditions of the positive electrode active material thus obtained are presented in Table 1 and evaluation results are presented in Tables 2 and 3.

Example 5

A positive electrode active material was obtained and evaluated in a similar manner to Example 1, except that in the mixing step, the obtained nickel-manganese-cobalt composite hydroxide particles, lithium hydroxide, and titanium oxide ($TiO_2$) having an average particle size of 2.5 μm were weighed so that the mole number ratio of lithium:nickel:manganese:cobalt:titanium was 1.05:0.83:0.10:0.05:0.02 and the firing temperature in the firing step was set to 760° C. The production conditions of the positive electrode active material thus obtained are presented in Table 1 and evaluation results are presented in Tables 2 and 3.

Comparative Example 1

A positive electrode active material was obtained and evaluated in a similar manner to Example 1, except that in the mixing step, titanium oxide was not prepared, the obtained nickel-manganese-cobalt composite hydroxide particles were weighed so that the mole number ratio of lithium:nickel:manganese:cobalt was 1.02:0.85:0.10:0.05, the firing temperature in the firing step was set to 800° C., and the water-washing step and the drying step were not performed. The production conditions of the positive electrode active material thus obtained are presented in Table 1 and evaluation results are presented in Tables 2 and 3.

Comparative Example 2

The lithium-nickel-manganese-cobalt composite oxide particles obtained in the firing step of Comparative Example 1 were subjected to the water-washing step and the drying step in a similar manner to Example 1 so as to obtain a positive electrode active material and the positive electrode active material was evaluated. The production conditions of the positive electrode active material thus obtained are presented in Table 1 and evaluation results are presented in Tables 2 and 3.

Comparative Example 3

A positive electrode active material was obtained and evaluated in a similar manner to Example 1, except that the water-washing step and the drying step were not performed. The production conditions of the positive electrode active material thus obtained are presented in Table 1 and evaluation results are presented in Tables 2 and 3.

Comparative Example 4

A positive electrode active material was obtained and evaluated in a similar manner to Example 2, except that in the firing step, the lithium mixture was fired in an oxygen (oxygen concentration: 60% by volume) flow, and the water-washing step and the drying step were not performed. Furthermore, as a result of XRD measurement, a peak attributed to $LiTiO_2$ was confirmed. The production conditions of the positive electrode active material thus obtained are presented in Table 1 and evaluation results are presented in Tables 2 and 3.

Comparative Example 5

A positive electrode active material was obtained and evaluated in a similar manner to Example 1, except that in the mixing step, the obtained nickel-manganese-cobalt composite hydroxide particles, lithium hydroxide, and titanium oxide ($TiO_2$) having an average particle size of 2.5 μm were weighed so that the mole number ratio of lithium:nickel:manganese:cobalt:titanium was 1.01:0.79:0.08:0.05:0.08, and the water-washing step and the drying step were not performed. Furthermore, as a result of XRD measurement, a peak attributed to $LiTiO_2$ was confirmed. The production conditions of the positive electrode active material thus obtained are presented in Table 1 and evaluation results are presented in Tables 2 and 3.

Comparative Example 6

A positive electrode active material was obtained and evaluated in a similar manner to Example 1, except that in the crystallization step, a 2.0 M mixed aqueous solution of nickel sulfate, manganese sulfate, and cobalt sulfate was added into a reaction tank so that the molar ratio among nickel:manganese:cobalt was 60:20:20 and nickel-manganese-cobalt composite hydroxide particles in which the mole number ratio of nickel, manganese, and cobalt was represented as Ni:Mn:Co=0.60:0.20:0.20 were obtained, in the mixing step, the obtained nickel-manganese-cobalt composite hydroxide particles, lithium hydroxide, and titanium oxide ($TiO_2$) having an average particle size of 2.5 μm were weighed so that the mole number ratio of lithium:nickel:manganese:cobalt:titanium was 1.03:0.58:0.20:0.20:0.02, the firing temperature in the firing step was set to 900° C., and the water-washing step and the drying step were not performed. The production conditions of the positive electrode active material thus obtained are presented in Table 1 and evaluation results are presented in Tables 2 and 3.

TABLE 1

| | Mixing step | | Firing step | | Water-washing step |
|---|---|---|---|---|---|
| | Titanium compound | Volume average particle diameter (titanium compound) μm | Oxygen concentration vol. % | Firing temperature ° C. | Water mixing amount g/100 g |
| Example 1 | TiO$_2$ | 2.5 | 90 | 800 | 150 |
| Example 2 | TiO$_2$ | 2.5 | 90 | 760 | 150 |
| Example 3 | TiO$_2$ | 2.5 | 90 | 780 | 150 |
| Example 4 | TiO$_2$ | 2.5 | 90 | 790 | 150 |
| Example 5 | TiO$_2$ | 2.5 | 90 | 760 | 150 |
| Comparative Example 1 | — | — | 90 | 800 | — |
| Comparative Example 2 | — | — | 90 | 800 | 150 |
| Comparative Example 3 | TiO$_2$ | 2.5 | 90 | 800 | — |
| Comparative Example 4 | TiO$_2$ | 2.5 | 60 | 760 | — |
| Comparative Example 5 | TiO$_2$ | 2.5 | 90 | 800 | — |
| Comparative Example 6 | TiO$_2$ | 2.5 | 90 | 900 | — |

TABLE 2

| | Positive electrode active material physical property | | | | | | | | | | | |
|---|---|---|---|---|---|---|---|---|---|---|---|---|
| | Mole number ratio | | | | | Heterophase | $I_{Ti\ compound}/I_{(003)}$ | Crystallite diameter at (003) plane nm | Eluted lithium amount % by mass | Volume average particle diameter Mv μm | Particle size distribution width | Specific surface area m$^2$/g |
| | Li a | Ni — | Mn x | Co y | Ti z | | | | | | | |
| Example 1 | 1.03 | 0.81 | 0.10 | 0.05 | 0.04 | — | 0 | 153 | 0.11 | 14.0 | 0.95 | 1.28 |
| Example 2 | 1.03 | 0.81 | 0.10 | 0.05 | 0.04 | — | 0 | 101 | 0.13 | 12.2 | 0.88 | 1.34 |
| Example 3 | 1.03 | 0.82 | 0.10 | 0.05 | 0.03 | — | 0 | 132 | 0.11 | 12.6 | 0.88 | 1.11 |
| Example 4 | 1.03 | 0.82 | 0.10 | 0.05 | 0.03 | — | 0 | 150 | 0.09 | 12.0 | 0.89 | 1.09 |
| Example 5 | 1.03 | 0.83 | 0.10 | 0.05 | 0.02 | — | 0 | 142 | 0.06 | 12.5 | 0.92 | 0.87 |
| Comparative Example 1 | 1.02 | 0.85 | 0.10 | 0.05 | 0.00 | — | 0 | 168 | 0.14 | 13.9 | 0.87 | 0.26 |
| Comparative Example 2 | 1.00 | 0.85 | 0.10 | 0.05 | 0.00 | — | 0 | 155 | 0.03 | 12.6 | 0.84 | 0.59 |
| Comparative Example 3 | 1.05 | 0.81 | 0.10 | 0.05 | 0.04 | — | 0 | 138 | 0.38 | 14.0 | 0.96 | 0.30 |
| Comparative Example 4 | 1.05 | 0.82 | 0.10 | 0.05 | 0.03 | LiTiO$_2$ | 0.21 | 89 | 0.52 | 16.7 | 0.95 | 0.25 |
| Comparative Example 5 | 1.01 | 0.79 | 0.08 | 0.05 | 0.08 | LiTiO$_2$ | 0.34 | 121 | 0.24 | 13.8 | 0.82 | 0.28 |
| Comparative Example 6 | 1.03 | 0.58 | 0.20 | 0.20 | 0.02 | — | 0 | 189 | 0.05 | 14.2 | 0.93 | 0.26 |

TABLE 3

| | Electrochemical evaluation Initial capacity | | Thermal stability evaluation | |
|---|---|---|---|---|
| | Charge | Discharge | Maximum oxygen generation peak intensity | Oxygen generation amount |
| Unit | mAh/g | mAh/g | — | % by mass |
| Example 1 | 223.1 | 198.7 | 40 | 2.0 |
| Example 2 | 220.3 | 185.5 | 39 | 1.9 |
| Example 3 | 223.6 | 198.0 | 46 | 2.5 |
| Example 4 | 224.1 | 201.3 | 45 | 2.3 |
| Example 5 | 227.4 | 204.1 | 56 | 3.2 |
| Comparative Example 1 | 236.3 | 210.8 | 100 | 4.2 |
| Comparative Example 2 | 232.7 | 207.1 | 102 | 4.4 |
| Comparative Example 3 | 221.6 | 177.3 | 38 | 1.7 |
| Comparative Example 4 | 205.3 | 174.2 | 57 | 2.2 |

TABLE 3-continued

| | Electrochemical evaluation Initial capacity | | Thermal stability evaluation | |
| --- | --- | --- | --- | --- |
| | | | Maximum oxygen generation peak | Oxygen generation |
| Unit | Charge mAh/g | Discharge mAh/g | intensity — | amount % by mass |
| Comparative Example 5 | 208.2 | 172.1 | 40 | 1.5 |
| Comparative Example 6 | 192.1 | 169.2 | 34 | 1.1 |

(Evaluation Results)

As presented in Tables 1 to 3, the positive electrode active materials obtained in Examples have extremely favorable thermal stability, and also have a high initial charge and discharge capacity. In any of the positive electrode active materials obtained in Examples, titanium is solid-solved in the crystal phase, and there is no precipitation of the impurity phase (heterophase).

On the other hand, in the positive electrode active material of Comparative Example 1, since titanium is not added, thermal stability is low. Furthermore, since the water-washing step and the drying step are not performed, the specific surface area is low.

In the positive electrode active material of Comparative Example 2, regardless of execution of the water-washing step and the drying step, as compared to the positive electrode active material of Comparative Example 1, the initial charge and discharge capacity was slightly decreased, the maximum oxygen generation peak intensity and the oxygen generation amount were also slightly increased, and both the battery capacity and the thermal stability were not improved.

In the positive electrode active material of Comparative Example 3, since the water-washing step and the drying step are not performed, the specific surface area is small, and the initial discharge capacity is low. Furthermore, the eluted lithium amount is also large.

In the positive electrode active material of Comparative Example 4, since the oxygen concentration at the time of firing is low, some of titanium cannot be solid-solved in the positive electrode active material and an impurity phase is formed. Therefore, although thermal stability is favorable, the initial charge and discharge capacity is significantly decreased due to lithium deficiency in the positive electrode active material or cationic mixing. Furthermore, since the water-washing step and the drying step are not performed, the specific surface area is small, and the eluted lithium amount is large.

In the positive electrode active material of Comparative Example 5, since the addition amount of titanium is large, for example, thermal stability is favorable in the same level as the positive electrode active materials of Examples 1 and 2, but a large amount of the Ti compound is precipitated due to excessive addition of titanium, and the initial charge and discharge capacity is significantly degraded. A decrease in Ni amount contributing to redox due to an increase in the titanium amount also affects a decrease in capacity, and it is speculated that thermal stability is apparently improved because of low electrochemical characteristics. Furthermore, since the water-washing step and the drying step are not performed, the specific surface area is small, and the eluted lithium amount is large.

In the positive electrode active material of Comparative Example 6, since the nickel ratio in the positive electrode active material is lower than those of Examples, thermal stability is favorable, but the initial charge and discharge capacity is significantly degraded.

As described above, the positive electrode active material for a lithium ion secondary battery, the method for producing a positive electrode active material for a lithium ion secondary battery, and the lithium ion secondary battery according to an embodiment of the present invention can provide a positive electrode active material with which a lithium ion secondary battery with both high thermal stability and excellent battery characteristics achieved at a high level. Furthermore, the present invention can produce such a positive electrode active material easily in industrial scale production, and is considered to be extremely industrially valuable.

INDUSTRIAL APPLICABILITY

In the present embodiment, a positive electrode active material for a non-aqueous electrolyte secondary battery with both high thermal stability and excellent battery characteristics achieved at a high level can be obtained by an industrial production method. Furthermore, this non-aqueous electrolyte secondary battery is suitable for a power source of a small portable electronic device (such as a notebook personal computer or a mobile phone terminal) that is required to have a high capacity and a long service time all the time.

The secondary battery according to an embodiment of the present invention is excellent in safety and further excellent in capacity and durability also in comparison with a battery produced using a conventional positive electrode active material of a lithium-nickel-based oxide. Therefore, the secondary battery is suitably used as a power source for electric cars that are restricted in mounting space since microminiaturization and increased service time thereof are possible.

The positive electrode active material according to an embodiment of the present invention and the secondary battery produced using the same can be used not only as a power source for electric cars driven purely by electric energy but also as a power source and a stationary storage battery for so-called hybrid cars used together with a combustion engine such as a gasoline engine or a diesel engine.

Note that, although each embodiment and each example of the present invention have been described in detail as described above, it is easy for those skilled in the art to understand that various modifications are possible without substantially departing from new matters and effects of the present invention. Therefore, all of such modified examples are included within the scope of the present invention.

For example, a term used at least once in the description or drawings together with a different term that is broader or the same in meaning can also be replaced by the different term in any place in the description or drawings. Furthermore, the configurations and operations of the positive electrode active material for a lithium ion secondary battery, the lithium ion secondary battery, and the method for producing a positive electrode active material for a lithium ion secondary battery are not limited to those described in each embodiment and each example of the present invention but may be carried out in various modifications.

One or more of the requirements described in the above embodiments and the like may be omitted. Furthermore, the requirements described in the above embodiments and the like can be combined as appropriate. In addition, to the extent permitted by law, the disclosure of Japanese Patent Application No. 2020-161397, which is a Japanese patent application, and all the literatures cited in this specification is incorporated as part of the description of the text.

REFERENCE SIGNS LIST

CBA Coin-type battery
PE Positive electrode (electrode for evaluation)
NE Negative electrode (lithium metal)
SE Separator
GA Gasket
WW Wave washer
PC Positive electrode can
NC Negative electrode can

The invention claimed is:

1. A positive electrode active material for a lithium ion secondary battery, comprising a lithium-nickel-manganese composite oxide configured by secondary particles with a plurality of aggregated primary particles,
   wherein the lithium-nickel-manganese composite oxide has a hexagonal layered structure and contains lithium (Li), nickel (Ni), manganese (Mn), an element M (M) that is at least one element selected from the group consisting of Co, V, Mg, Mo, Ca, Cr, Ta, Na, W, Fe, Zn, B, Si, P, Zr, Nb, and Al, and titanium (Ti),
   a mole number ratio of the elements is represented as Li:Ni:Mn:M:Ti=a:(1-x-y-z):x:y:z, provided that $0.97 \leq a \leq 1.25$, $0.03 \leq x \leq 0.15$, $0 \leq y \leq 0.15$, and $0.01 \leq z \leq 0.05$,
   a ratio of a total amount of peak intensities of most intense peaks of a titanium compound to a (003) diffraction peak intensity that is the most intense peak of a hexagonal layered structure in XRD measurement of the positive electrode active material is 0.2 or less,
   a crystallite diameter at (003) plane as determined by the XRD measurement is 80 nm or more and less than 160 nm, and
   a specific surface area as measured by a BET method is $0.7 \text{ m}^2/\text{g}$ or more and $4.0 \text{ m}^2/\text{g}$ or less.

2. The positive electrode active material for a lithium ion secondary battery according to claim 1, wherein [(D90−D10)/Mv] calculated by D90 and D10 based on the volume standard in a particle size distribution by a laser diffraction scattering method and a volume average particle diameter (Mv) and indicating a particle size distribution width is 0.80 or more and 1.20 or less.

3. The positive electrode active material for a lithium ion secondary battery according to claim 1, wherein a volume average particle diameter Mv is 8 μm or more and 20 μm or less.

4. The positive electrode active material for a lithium ion secondary battery according to claim 1, wherein an amount of lithium eluted in water when the positive electrode active material is immersed in water is 0.2% by mass or less with respect to the whole positive electrode active material.

5. A method for producing a positive electrode active material for a lithium ion secondary battery which contains a lithium-nickel-manganese composite oxide configured by secondary particles with a plurality of aggregated primary particles, the method comprising:
   a mixing step of adding a mixture containing at least a nickel-manganese composite compound, a titanium compound, and a lithium compound;
   a firing step of firing the mixture in an oxidizing atmosphere having an oxygen concentration of 80 vol % or more and 100 vol % or less at 700° C. or higher and 950° C. or lower so as to obtain the lithium-nickel-manganese composite oxide;
   a water-washing step of mixing water at a ratio of 50 parts by mass or more and 200 parts by mass or less with respect to 100 parts by mass of the lithium-nickel-manganese composite oxide and stirring the mixture so as to perform solid-liquid separation; and
   a drying step of drying the water-washed lithium-nickel-manganese composite oxide,
   wherein the nickel-manganese composite compound contains nickel (Ni), manganese (Mn), and an element M (M) that is at least one element selected from the group consisting of Co, V, Mg, Mo, Ca, Cr, Ta, Na, W, Fe, Zn, B, Si, P, Zr, Nb, and Al, and a mole number ratio of the elements is represented as Ni:Mn:M=(1-x-y):x:y, provided that $0.03 \leq x \leq 0.15$ and $0 \leq y \leq 0.15$,
   a ratio (Li/Me) of a lithium mole number (Li) to a total mole number (Me) of nickel, manganese, the element M, and titanium contained in the mixture is 0.97 or more and 1.25 or less, and a ratio (Ti/Me) of a titanium mole number (Ti) to the total mole number (Me) is 0.01 or more and 0.05 or less,
   a ratio of a total amount of diffraction peak intensities of most intense peaks of the titanium compound to a (003) diffraction peak intensity that is the most intense peak of a hexagonal layered structure in XRD measurement of the positive electrode active material is 0.2 or less, and
   a crystallite diameter at (003) plane as determined by the XRD measurement is 80 nm or more and less than 160 nm.

6. The method for producing a positive electrode active material for a lithium ion secondary battery according to claim 5, wherein a volume average particle diameter Mv of the titanium compound is 0.01 μm or more and 5 μm or less.

7. The method for producing a positive electrode active material for a lithium ion secondary battery according to claim 5, wherein the titanium compound is titanium oxide.

8. A lithium ion secondary battery comprising: a positive electrode; a negative electrode; and a non-aqueous electrolyte, the positive electrode containing the positive electrode active material according to claim 1.

* * * * *